(12) United States Patent
Habian et al.

(10) Patent No.: US 11,275,751 B2
(45) Date of Patent: Mar. 15, 2022

(54) SYSTEM AND METHOD FOR CONNECTING DESIGNERS WITH SUPPLIERS IN THE CONSTRUCTION INDUSTRY

(71) Applicants: Robert L. Habian, Rocklin, CA (US); Steven C. Ayers, Davis, CA (US)

(72) Inventors: Robert L. Habian, Rocklin, CA (US); Steven C. Ayers, Davis, CA (US)

(73) Assignee: Tect App, Inc., Sacramento, CA (US)

( * ) Notice: Subject to any disclaimer, the term of this patent is extended or adjusted under 35 U.S.C. 154(b) by 74 days.

(21) Appl. No.: 16/841,319

(22) Filed: Apr. 6, 2020

(65) Prior Publication Data

US 2021/0311940 A1 Oct. 7, 2021

(51) Int. Cl.
| | |
|---|---|
| *G06F 16/245* | (2019.01) |
| *G06F 16/2458* | (2019.01) |
| *G06F 16/248* | (2019.01) |
| *G06F 16/29* | (2019.01) |
| *G06F 30/13* | (2020.01) |

(52) U.S. Cl.
CPC ........ *G06F 16/2458* (2019.01); *G06F 16/248* (2019.01); *G06F 16/29* (2019.01); *G06F 30/13* (2020.01)

(58) Field of Classification Search
CPC .... G06F 16/2458; G06F 16/248; G06F 16/29; G06F 30/13
See application file for complete search history.

(56) References Cited

U.S. PATENT DOCUMENTS

| | | |
|---|---|---|
| 9,264,662 B2 | 2/2016 | Shapiro |
| 9,336,515 B2 | 5/2016 | Warren |
| 9,942,180 B2 | 4/2018 | Sicar |
| 2011/0029339 A1* | 2/2011 | Callahan ............... G06Q 10/10 705/7.29 |
| 2012/0239581 A1 | 9/2012 | Mosher |
| 2016/0063110 A1 | 3/2016 | Shoup |
| 2016/0246936 A1 | 8/2016 | Kahn |
| 2018/0075413 A1 | 3/2018 | Culver |

OTHER PUBLICATIONS

PCT International Search Reportrand Written Opinion, International Application No. PCT/US21/24541, International Filing Date: Mar. 27, 2021, dated Jul. 8, 2021.

* cited by examiner

*Primary Examiner* — Truong V Vo

(74) *Attorney, Agent, or Firm* — Inventive Law Inc.; Jim H. Salter

(57) ABSTRACT

A system and method for connecting architects and design professionals with building product suppliers or manufacturers in the construction industry is disclosed. An example embodiment is configured to: establish a data connection with at least one architect or design professional (A/DP) platform and at least one building material supplier, building product manufacturer, and other building product expert (BPE) platform; match an A/DP at the A/DP platform with a BPE at the BPE platform based on a correlation between the project geographical location, the project type, and the project section as related to specific building product genres and geographical locations in which the BPE has represented possession of product expertise; and enable communication between the A/DP and the matched BPE, the communication including an option of either an open or veiled chat session, the veiled chat session preventing the BPE from viewing private information of the A/DP and/or their project.

20 Claims, 51 Drawing Sheets

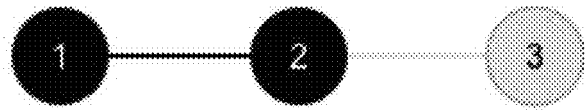
Company Admin
Enter your information below to create a Company Administrator Profile.
Your name
[Your name]
Your title
[Your title]
Your e-mail
[Your e-mail]
< PREVIOUS    NEXT >
Fig. 7

Congratulations

You've successfully added your company and your company administrator.

Now, let's add your Building Product Experts (BPE). Note that not all product representatives may qualify as "expert". Design professionals prefer to speak with BPE's whenever possible.

Are you also serving as a BPE?

○ Yes     ● No

NEXT >

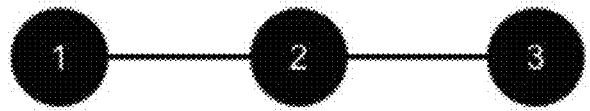
Building Product Experts
You can add as many Building Product Experts as you'd like. Simply add them through a simple form.
+ ADD BUILDING PRODUCT EXPERT
< PREVIOUS    NEXT >
Fig. 9

Add BPE

Add product section

Enter the CSI MasterFormat for the products that you represent.

MasterFormat / CSI Division

[Select CSI Division]

MasterFormat / CSI Section/Sub-Section(s)

[Select CSI Section/Sub-Section]

Enter the specific webpage for this product section

[Enter https://www.yoursite.com/page]

About the product section

[Tell us something about your product sections and the products you represent]

Keywords

[Add as many keywords as you wish, separated by a comma]

Add product names

[Enter any product names that might help design professionals find you]

Where is the product available?

[Select States / Counties / City]

[CANCEL] [ADD SECTION]

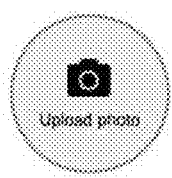

Building Product Expert

Please fill in as much as you can

Name*

Jasper Afman

Title of BPE*

Metal Specialist

About the Building Product Expert

My name is Jasper Afman and I've been working in the industries for many years. I know everything about metal, you can literally ask me anything about it!

E-mail* jasper.afman@metalworks.com

Phone*

0612345678

Expert in the products

Metal                                          ×
05 51 00 - Metal Stairs
Available in: AZ, CA              

+ ADD PRODUCT SECTION

CANCEL        

Fig. 15

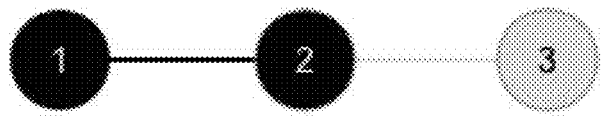
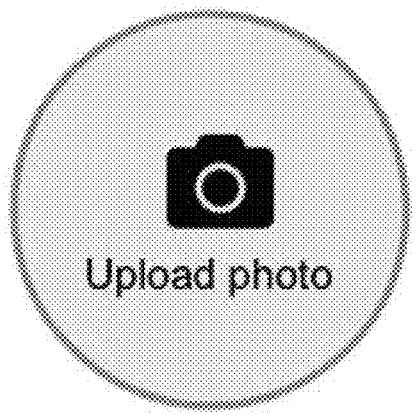
Fig. 21

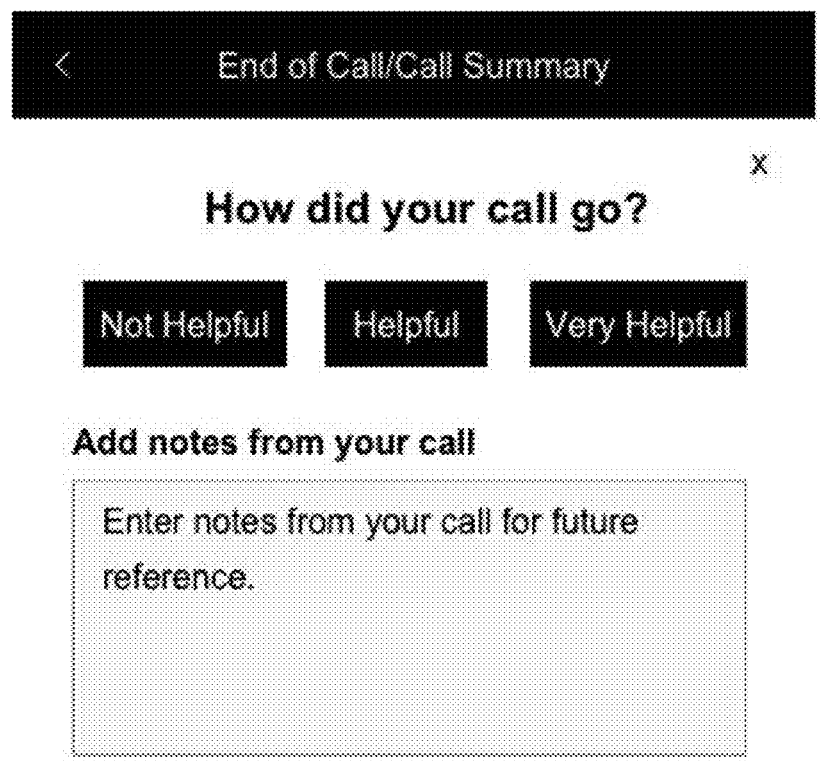
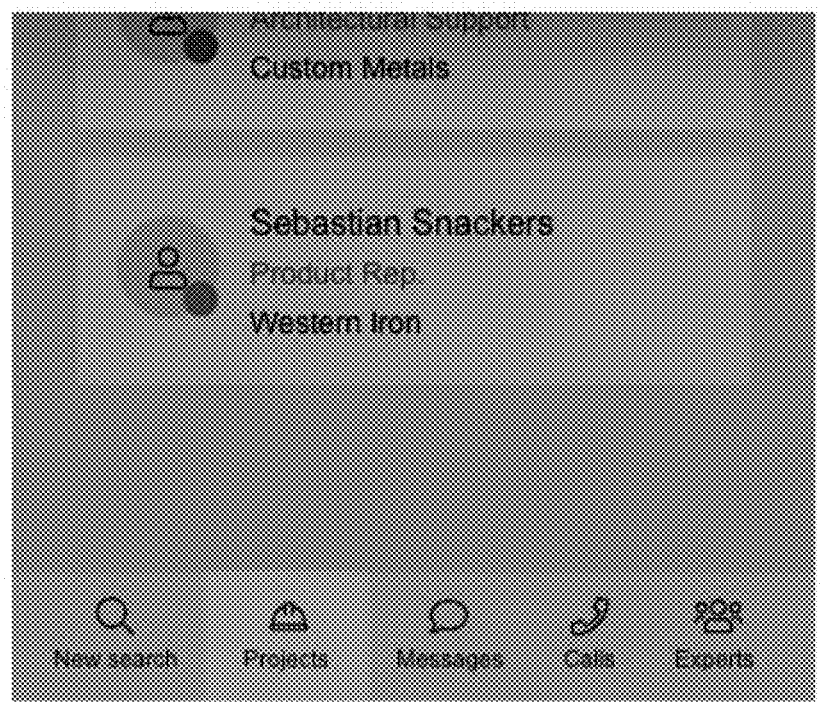
Fig. 40

Project summary

Central Tower
Los Angeles, Commercial Office

Summary    Search experts    Messages (2)

🔍 Search

Connected BPE's

Jasper Afman ★
Metal Specialist
Metal Works, Inc.   >

Sebastian Snackers
Product Rep.
Western Iron   >

Found products

Metal Spiral Stair
05 51 00 - Metal Stairs
BPE: Jasper Afman

New search | Projects | Messages | Calls | Experts

SYSTEM AND METHOD FOR CONNECTING DESIGNERS WITH SUPPLIERS IN THE CONSTRUCTION INDUSTRY

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2019-2020 Tect App, Inc., All Rights Reserved.

TECHNICAL FIELD

This patent application relates to computer-implemented software systems, according to one embodiment, and more specifically to a system and method for connecting designers with product suppliers or manufacturers in the construction industry.

BACKGROUND

Building designers, such as architects or other design professionals, frequently need information related to building products or materials, costs, lead times, product specifications, compatible products, and the like when these designers are in the initial stages of a building project. In many cases, designers may not even be aware of the types and costs of the available building materials, particularly in different geographical locations where building projects are planned. Because the choice and availability of materials and suppliers can significantly affect the design direction, contract documents, and preliminary cost information being prepared by a designer, it is extremely important for the designer to have current, accurate, and sometimes detailed information on a wide variety of building materials and product suppliers at the time when the designer is preparing their work at the early design and cost estimating stages. Unfortunately, most designers do not have timely access to this building material and product supplier information. In many cases, a designer will simply consult with suppliers, if known, from a previous project. However, this practice can cause the designer to miss new innovations in building materials or fail to take advantage of lower cost supplier options. Additionally, designers can miss issues with product availability that may arise when building projects in unfamiliar locations are being designed and bid. Designers can use general search queries of online building product sources. However, this process produces too much information, consumes too much time, and does not yield optimal results. Additionally, this process can expose the designer to undesirable sales pitches from building product and material vendors. Thus, a better way is needed to enable architects and design professionals to obtain current and accurate building product information, costing, availability, usage, and specifications on a wide variety of building materials and product suppliers with a minimal level of time and effort.

SUMMARY

In various example embodiments described herein, a system and method for connecting designers with product suppliers or manufacturers in the construction industry are disclosed. In the various example embodiments described herein, a computer-implemented tool or software application (app) as part of a supplier engagement system is described to automate and improve the ability for architects and design professionals to efficiently connect and engage with product suppliers for a building project. As described in more detail below, a computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, consumer electronic devices, or any other type of computing, data processing, communication, networking, or electronic system.

In various example embodiments described herein, the supplier engagement system provides a set of processes to facilitate an architect or design professional's ability to search for and connect with a building product supplier or manufacturer best suited to provide needed information for the designer. Various example embodiments of the supplier engagement system are described in detail below.

BRIEF DESCRIPTION OF THE DRAWINGS

The various embodiments are illustrated by way of example, and not by way of limitation, in the figures of the accompanying drawings in which:

FIGS. 3 through 40 illustrate example screenshots of a mobile device user interface of an example embodiment;

FIGS. 41 through 48 illustrate additional examples of the features, processing, and user interfaces provided by various example embodiments;

DETAILED DESCRIPTION

Figure 1:
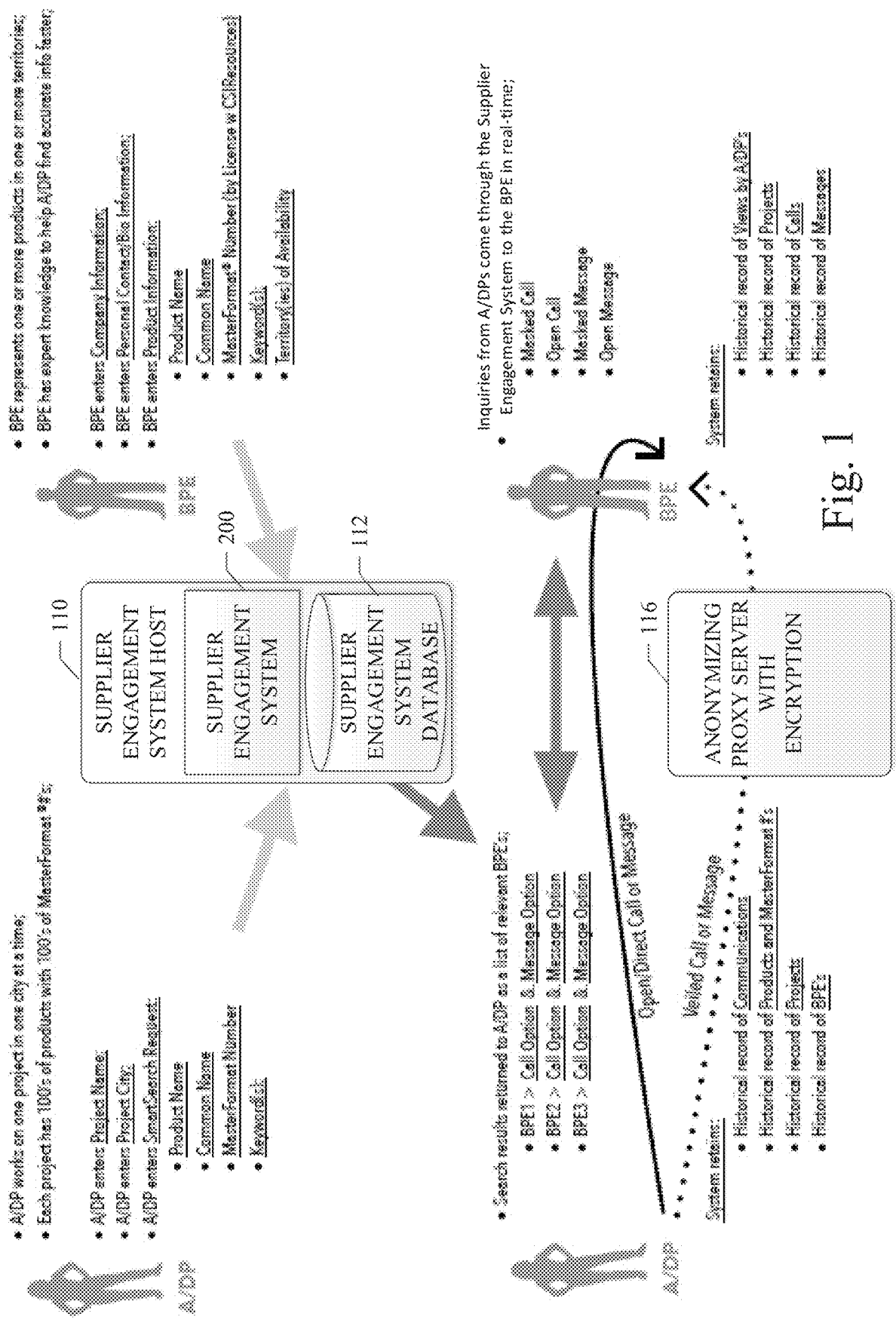
FIG. 1 illustrates an example embodiment of a supplier engagement system wherein architects and design professionals (denoted herein A/DPs) can search, connect, and communicate with building material suppliers, product manufacturers, and other building product experts (denoted herein BPEs)

In the following description, for purposes of explanation, numerous specific details are set forth in order to provide a thorough understanding of the various embodiments. It will be evident, however, to one of ordinary skill in the art that the various embodiments may be practiced without these specific details.

In the various example embodiments described herein, a computer-implemented tool or software application (app) as part of a supplier engagement system is described to automate and improve the ability for architects and design professionals, (denoted herein A/DPs) to efficiently connect and engage with product suppliers for a building project. As described in more detail below, a computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, consumer electronic devices, or any other type of computing, data processing, communication, networking, or electronic system.

In various example embodiments described herein, the supplier engagement system provides a set of processes to help A/DPs obtain information related to building materials and products during (and early into) the building design phase. Online directories are available that attempt to match A/DPs with building material suppliers, product manufacturers, and other building product experts (denoted herein BPEs); however, these conventional systems use a "product-first" search, which assumes the A/DP already knows the details of the products for which the designer is searching. This approach is quickly overwhelming for the A/DP as there are many building product and material choices from which to choose. Further, the conventional systems tend to serve the suppliers and manufacturers more than the A/DPs. The conventional systems require the A/DP to enter a significant amount of personal information and/or project information in order to have even limited access to a BPE contact. As a result, the A/DP is exposed to undesired sales pitches from the representatives of the BPEs. None of the conventional systems provide: 1) localization of product availability; 2) contact information for BPEs by region; and 3) a veiled/masked option for A/DPs to enable A/DPs to query product information without exposing personal information and/or private information and/or project information. These features, lacking in the conventional systems, are provided by the various example embodiments disclosed herein. Thus, the disclosed embodiments, including a supplier engagement system, improve channels of communication between A/DPs and BPEs. These improved channels of communication include the ability for A/DPs to submit open-ended, localized searches for building products or materials, and obtain relevant and geographically appropriate search results without exposing their own personal information and/or private information and/or project information. Specifics of the various example embodiments are described in more detail below.

FIG. 1 illustrates an example embodiment of a supplier engagement system 200 wherein architects and building design professionals (denoted herein A/DPs) can search, connect, and communicate with building material suppliers, product manufacturers, and other building product experts (denoted herein BPEs) via the supplier engagement system 200. For example, in the upper left portion of FIG. 1, the example illustrates the interaction between an A/DP and the supplier engagement system 200. In general, the A/DP provides information related to a search for particular building products for a project in a particular geographical location. In the upper right portion of FIG. 1, the example illustrates the interaction between a BPE and the supplier engagement system 200. In general, the BPE provides information related to their expertise in particular building products or construction material available in particular locations. As described in more detail below, example embodiments of the supplier engagement system 200 enable the A/DP to submit search queries and connect with BPEs who have specific expertise in the particular building products available at a particular geographical location of interest to the A/DP.

Referring still to FIG. 1, the lower portion of the diagram illustrates the various communication options provided by the supplier engagement system 200 to connect the A/DP with an appropriate BPE in a voice call or text messaging (chat) session. Either the voice call or the text messaging (chat) session can be in an open/direct mode (i.e., the identity of the A/DP and/or project information can be disclosed) or in a veiled/masked mode (i.e., the identity of the A/DP and/or project information is not disclosed). In an example embodiment, an anonymizing proxy server 116 can be used to anonymize or make private the identity of the A/DP. By use of the veiled/masked communication mode of an example embodiment, the A/DPs can query product information without exposing their personal information and/or private information and/or project information. As shown in FIG. 1, the supplier engagement system 200 can retain historical information to log the details of a communication session between the A/DP and the BPE. In FIG. 1, the reference to the MasterFormat® corresponds to a standard for organizing specifications and other written information for commercial and institutional building projects in the U.S. and Canada.

Figure 2:
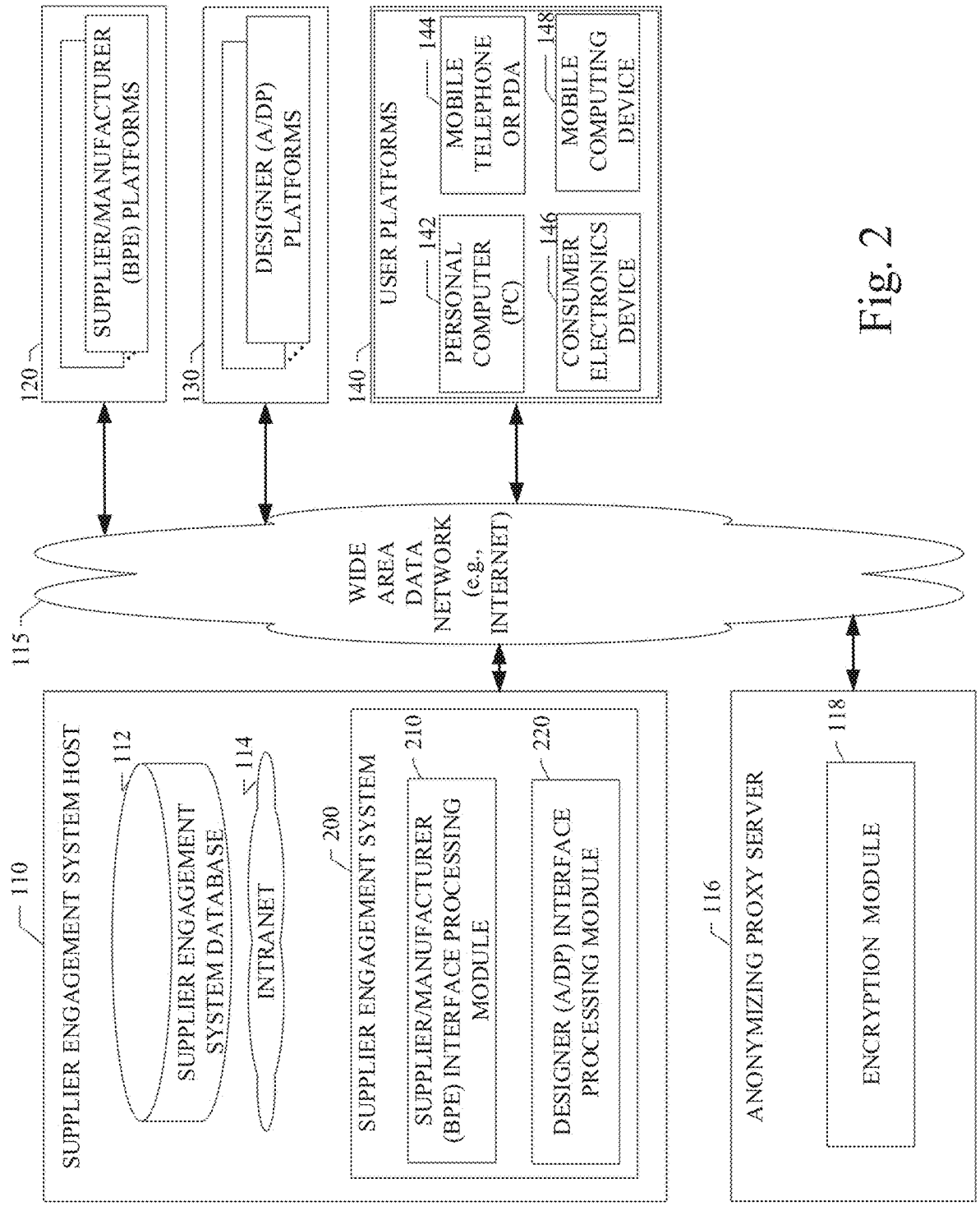
FIG. 2 illustrates an example embodiment of a networked system in which various embodiments may operate.

Referring now to FIG. 2, an example embodiment of a supplier engagement system 200 and a network ecosystem in which the supplier engagement system 200 can operate is illustrated. The supplier engagement system 200 provides a system and method for connecting designers (A/DPs) with suppliers or manufacturers (BPEs) in the construction industry. In various example embodiments, an application or service, typically provided by or operating on a host site (e.g., a website) 110, is provided to simplify and facilitate the downloading or hosted use of the supplier engagement system 200 of an example embodiment. In a particular embodiment, the supplier engagement system 200 can be downloaded from the host site 110 by a user at a user platform 140. The downloaded supplier engagement system 200 can be used as an application or app executing on the user platform 140. Alternatively, the supplier engagement system 200 can be hosted by the host site 110 for a networked user at a user platform 140. The details of the supplier engagement system 200 for an example embodiment are provided below.

Referring again to FIG. 2, the supplier engagement system 200 can be in network communication with a plurality of supplier/manufacturer (BPE) platforms 120 and/or designer (A/DP) platforms 130. The supplier/manufacturer (BPE) platforms 120 can include user platform computing and/or communication devices, websites, or other network resources at which product sellers, manufacturers, distributors, or brokers operate or at which information regarding sellers and products (e.g., building materials) offered for sale is available. The supplier engagement system 200 can be configured to provide data communications for the user platforms serving as networked platforms for A/DPs to submit queries and obtain building material or other building product information from an appropriate BPE in a digital or computer-readable form via the network 115. The designer (A/DP) platforms 130 can include user platform computing and/or communication devices configured to serve as networked platforms for A/DPs to obtain building product information. The supplier engagement system 200 can be configured to obtain this building product information in a digital or computer-readable form via the network 115. The supplier engagement system 200 can also be in network data communication with a plurality of user platforms serving as networked platforms for BPEs to receive queries from A/DPs and provide building material or other building product information to a requesting A/DP in a digital or computer-readable form via the network 115. The supplier engagement system 200 can also be in network data communication with a plurality of other information sites, such as construction or building information databases or data sources, online product directories, online supplier or manufacturer directories, rating services, and the like.

One or more of the supplier/manufacturer (BPE) platforms 120 and the designer (A/DP) platforms 130 can be provided by one or more third party providers operating at various locations in a network ecosystem. It will be apparent to those of ordinary skill in the art that supplier/manufacturer (BPE) platforms 120 or designer (A/DP) platforms 130 can include or be any of a variety of networked third party information requesters or providers or on-line computer system users as described in more detail below. In a particular embodiment, a resource list maintained at the host site 110 can be used as a summary or list of all supplier/manufacturer (BPE) platforms 120 and designer (A/DP) platforms 130, which users or the host site 110 may visit/access and from which users or the host site 110 can request and obtain building product information and building product supplier information. The host site 110, supplier/manufacturer (BPE) platforms 120, designer (A/DP) platforms 130, and user platforms 140 may communicate and transfer data and information in the data network ecosystem shown in FIG. 2 via a wide area data network (e.g., the Internet) 115. Various components of the host site 110 can also communicate internally via a conventional intranet or local area network (LAN) 114.

Networks 115 and 114 are configured to couple one computing device with another computing device. Networks 115 and 114 may be enabled to employ any form of computer readable media for communicating information from one electronic device to another. Network 115 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Networks 115 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 115 and 114 may also include an autonomous system of terminals, gateways, routers, and the like connected by wireless radio links or wireless transceivers. These connectors may be configured to move freely and randomly and organize themselves arbitrarily, such that the topology of networks 115 and 114 may change rapidly and arbitrarily.

Networks 115 and 114 may further employ a plurality of access technologies including 2nd (2G), 2.5, 3rd (3G), 4th (4G), 5th (5G) generation radio access for cellular systems, WLAN, Wireless Router (WR) mesh, and the like. Access technologies such as 2G, 3G, 4G, 5G, and future access networks may enable wide area coverage for mobile devices, such as one or more of client devices 141, with various degrees of mobility. For example, networks 115 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 115 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 115 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The supplier/manufacturer (BPE) platforms 120 and designer (A/DP) platforms 130 may include any of a variety of providers of network transportable digital data. The network transportable digital data can be transported in any of a family of file formats and associated mechanisms usable to enable a host site 110 and a user platform 140 to receive building product information from a supplier/manufacturer (BPE) platform 120 and to receive queries for building product information from a designer (A/DP) platform 130 over the network 115. In one embodiment, the file format can be a standard text format, a text messaging format, an email format, a voice file format, or a CSV (Comma Separated Values) format; however, the various embodiments are not so limited, and other file formats and transport protocols may be used. For example, data formats other than text, chat, voice, or CSV or formats other than open/standard formats can be supported by various embodiments. Any electronic file format, such as conventional database formats, Portable Document Format (PDF), audio (e.g., Motion Picture Experts Group Audio Layer 3—MP3, and the like), video (e.g., MP4, and the like), and any proprietary interchange format defined by specific sites can be supported by the various embodiments described herein. Moreover, a supplier/manufacturer (BPE) platform 120 and a designer (A/DP) platform 130 may provide a variety of different data sets or computational modules.

In a particular embodiment, a user platform 140 with one or more client devices enables a user to access data provided by the supplier engagement system 200 via the host 110 and network 115. Client devices of user platform 140 may include virtually any computing device that is configured to send and receive information over a network, such as network 115. Such client devices may include portable devices 144, such as, cellular telephones, smart phones, camera phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. The client devices may also include other computing devices, such as personal computers 142, multiprocessor systems, microprocessor-based or programmable consumer electronics, network PCs, and the like. The client devices may also include other processing devices, such as consumer electronic (CE) devices 146 and/or mobile computing devices 148, which are known to those of ordinary skill in the art. As such, the client devices of user platform 140 may range widely in terms of capabilities and features. Moreover, a web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

The client devices of user platform 140 may also include at least one client application that is configured to receive search queries, building product information, and/or control data from another computing device via a wired or wireless network transmission. The client application may include a capability to provide and receive text data, graphical data, video data, audio data, and the like. Moreover, client devices of user platform 140 may be further configured to communicate and/or receive a message or chat, such as through a Short Message Service (SMS), direct messaging (e.g., Twitter™), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Referring again to FIG. 2, an example embodiment can use an anonymizing proxy server 116, in data communication via network 115, to anonymize or make private the identity of the A/DP when an A/DP at an A/DP platform 130 initiates communication with a BPE at a BPE platform 120. The anonymizing proxy server 116 can include an encryption module 118 to encrypt or otherwise mask communications between the A/DP and the BPE. In a particular embodiment, the chat or call function between the A/DP and the BPE can be powered by Twilio®, which is a well-known provider of veiled or masked chat communications. The anonymizing proxy server 116 allows a seamless and private chat experience across all mobile or desktop platforms. The chat session can include text, photos, web links, and other attachments.

Referring again to FIG. 2, the supplier engagement system 200 for an example embodiment is shown to include a supplier engagement system database 112. The database 112 can be used to retain a variety of information data sets including, but not limited to, A/DP information, BPE information, building product or building product listing information, building material information, A/DP historical communication information, A/DP, BPE, and product analytics, and the like. It will be apparent to those of ordinary skill in the art that the supplier engagement system database 112 can be locally resident at the host site 110 or remotely located at other server locations or stored in network cloud storage.

Referring again to FIG. 2, host site 110 of an example embodiment is shown to include the supplier engagement system 200. In an example embodiment, supplier engagement system 200 can be an executable module of data processing instructions configured to be executed by a data processor of the supplier engagement system host 110 or user platform 140. The supplier engagement system 200 can include a supplier/manufacturer (BPE) interface processing module 210, and designer (A/DP) interface processing module 220. The supplier/manufacturer (BPE) interface processing module 210 can be configured to control and manage the user interface interactions of the BPE with the supplier engagement system 200. The supplier/manufacturer (BPE) interface processing module 210 can facilitate communication and the transfer of data and documents between a user at a supplier/manufacturer (BPE) platform 120 and the host site 110 or user platform 140. The designer (A/DP) interface processing module 220 can be configured to control and manage the user interface interactions of the A/DP with the supplier engagement system 200. The designer (A/DP) interface processing module 220 can facilitate communication and the transfer of data and documents between a user at a designer (A/DP) platform 130 and the host site 110 or user platform 140. These user interface interactions of the A/DP and the BPE are described in detail below. The supplier/manufacturer (BPE) interface processing module 210 and the designer (A/DP) interface processing module 220 can be configured to perform the processing as also described in more detail below. Each of these modules (210 and 220) can be implemented as software components executing within an executable environment of supplier engagement system 200 operating on host site 110 or user platform 140. The supplier/manufacturer (BPE) interface processing module 210 can be resident at the host site 110, resident on a supplier/manufacturer (BPE) platform 120, and/or partially resident on a plurality of user platforms 140. Similarly, the designer (A/DP) interface processing module 220 can be resident at the host site 110, resident on a designer platform 130, and/or partially resident on a plurality of user platforms 140. The supplier engagement system 200 be configured to provide data communications for the supplier/manufacturer (BPE) platforms 120 and the designer (A/DP) platforms 130 to enable the networked usage, transfer, or downloading of building product information, requests, images, documents, and related data to facilitate the querying, connection, and communication between an A/DP and a relevant BPE. The components and processes to facilitate the querying, connection, and communication between an A/DP and a relevant BPE as embodied in the supplier/manufacturer (BPE) interface processing module 210 and the designer (A/DP) interface processing module 220 are described in more detail below.

Referring now to FIGS. 3 through 40, example screenshots of a mobile device user interface of an example embodiment illustrate the features, processing, and user interfaces provided by various example embodiments. In the example embodiments illustrated, a user operating a mobile device user interface at a user platform 140 can interact with a hosted or locally resident supplier engagement system 200 to activate and manipulate the sample user interfaces shown in the accompanying figures. In the example embodiments shown, the supplier engagement system 200 can be implemented as an application (app) executing on a mobile device 144/148 of a user platform 140. The supplier/manufacturer (BPE) interface processing module 210 and the designer (A/DP) interface processing module 220, integrated into the supplier engagement system 200, can also be executed in an app on a mobile device 144/148 of a user platform 140. The execution of the supplier/manufacturer (BPE) interface processing module 210 and the designer (A/DP) interface processing module 220 can cause the display and data capture of the user interfaces shown in the accompanying figures and described in detail below.

Figure 3:
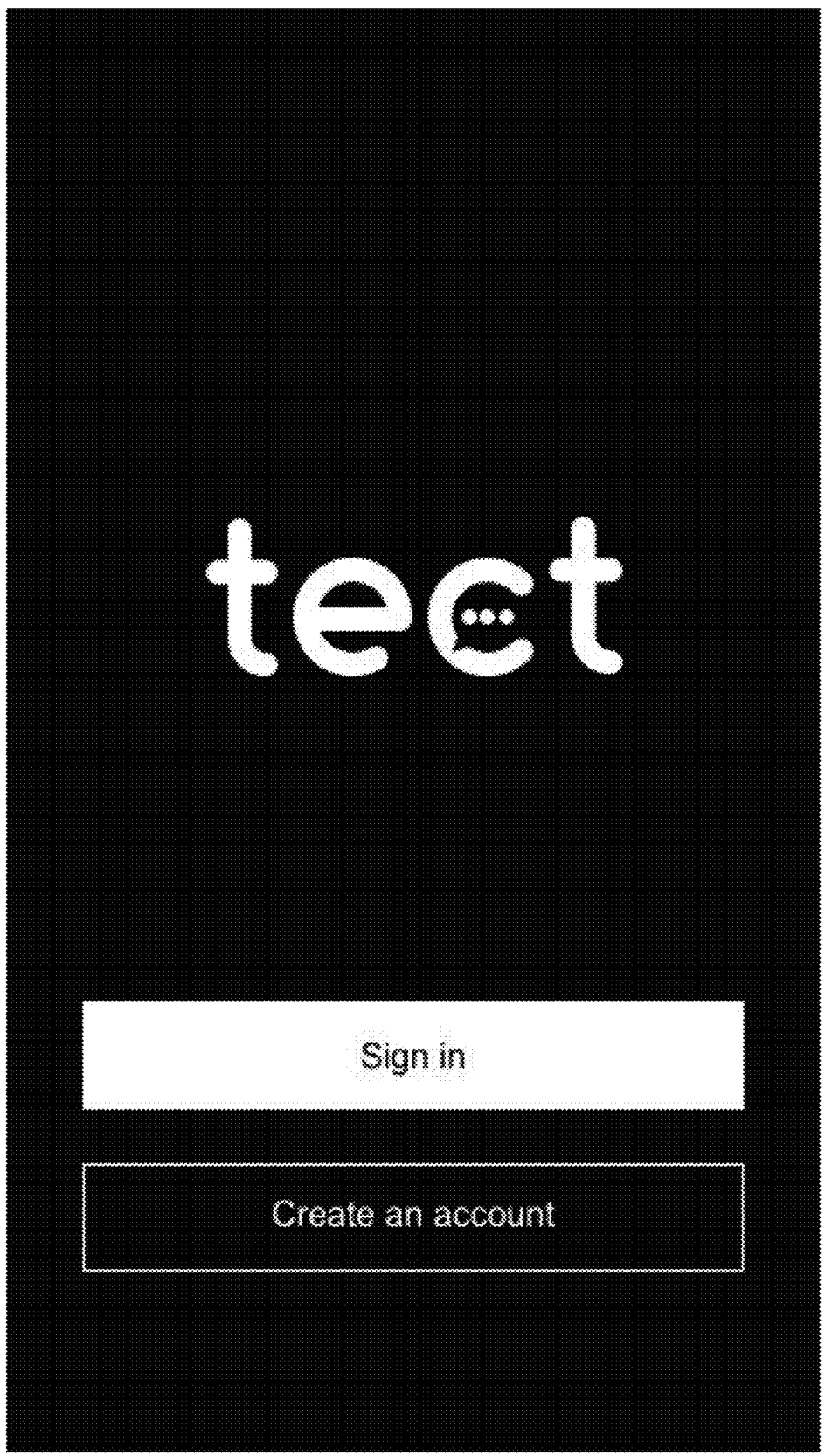
Figure 4:
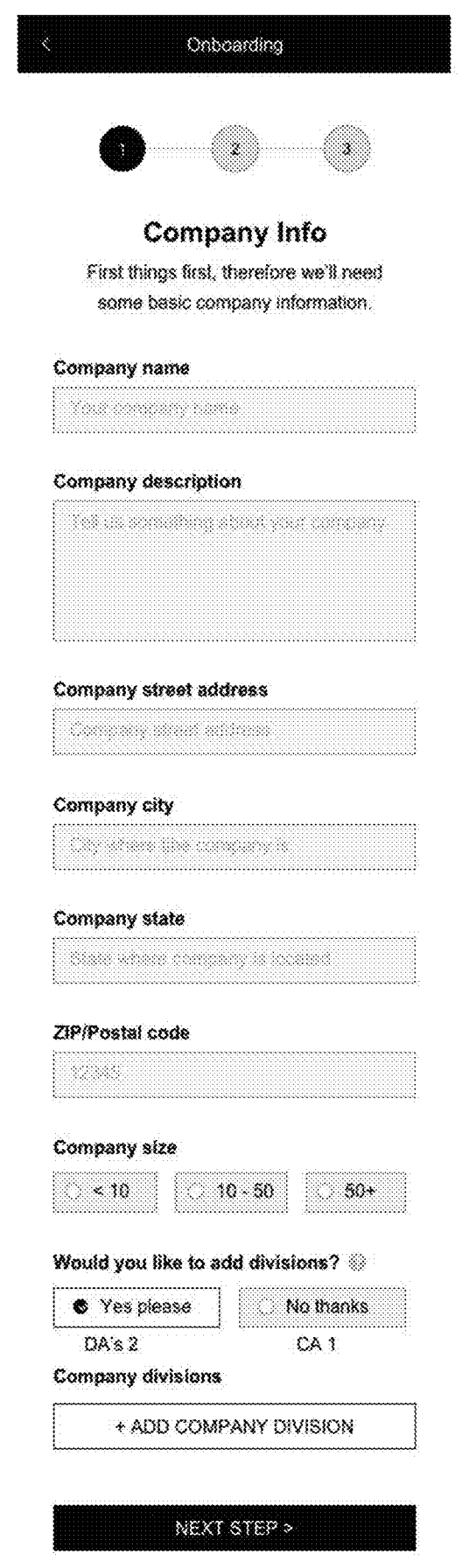
Figure 5:
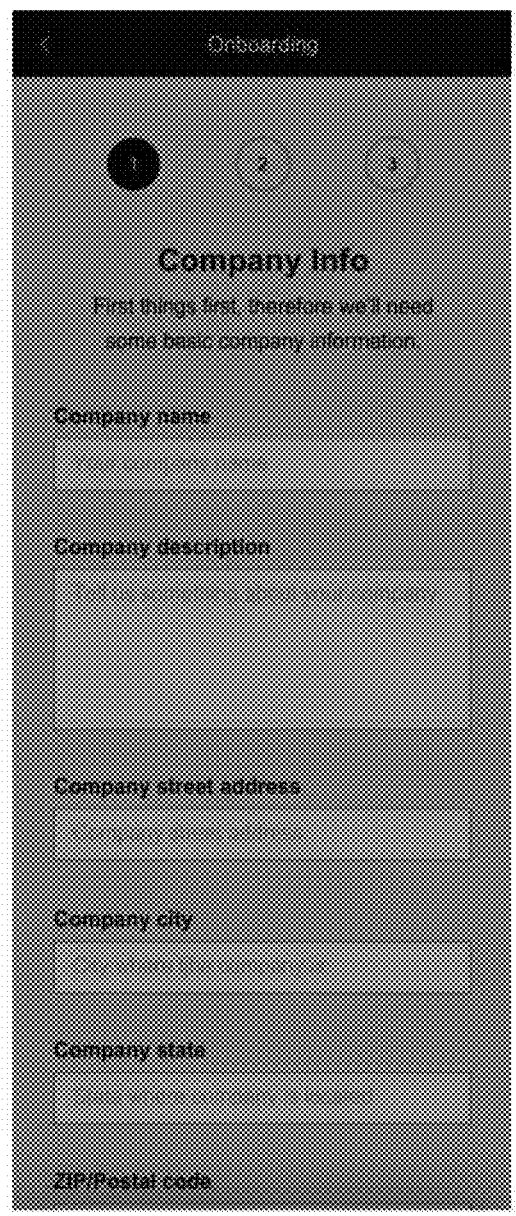

Referring now to FIG. 3, the example of FIG. 3 illustrates an opening splash screen when the app embodying the supplier engagement system 200 is opened or launched on a mobile device 144/148 of a user platform 140. In the initial set of user interface screen examples, the supplier/manufacturer (BPE) interface processing module 210 can control the display and data capture of the user interface. FIG. 4 illustrates a splash screen allowing login by existing users or the creation of a new user account. FIG. 5 illustrates an onboarding screen for use by companies to enter their relevant company information. The references to companies herein can include any type of business entities, organizations, associations, foundations, government agencies, and even individuals. The onboarding screens provide a way for entities to establish an identity with the supplier engagement system 200. Companies can choose to have just one company profile with one Company Administrator (CA). Alternatively, a company may choose to divide their users into "Company Divisions", which would allow the company account to have one CA, as well as multiple company divisions, each with a unique Division Administrator (DA). This functionality enabling company divisions allows larger or complex companies to be accommodated in a manner that provides multiple options for organizing company information and resources.

Figure 6:
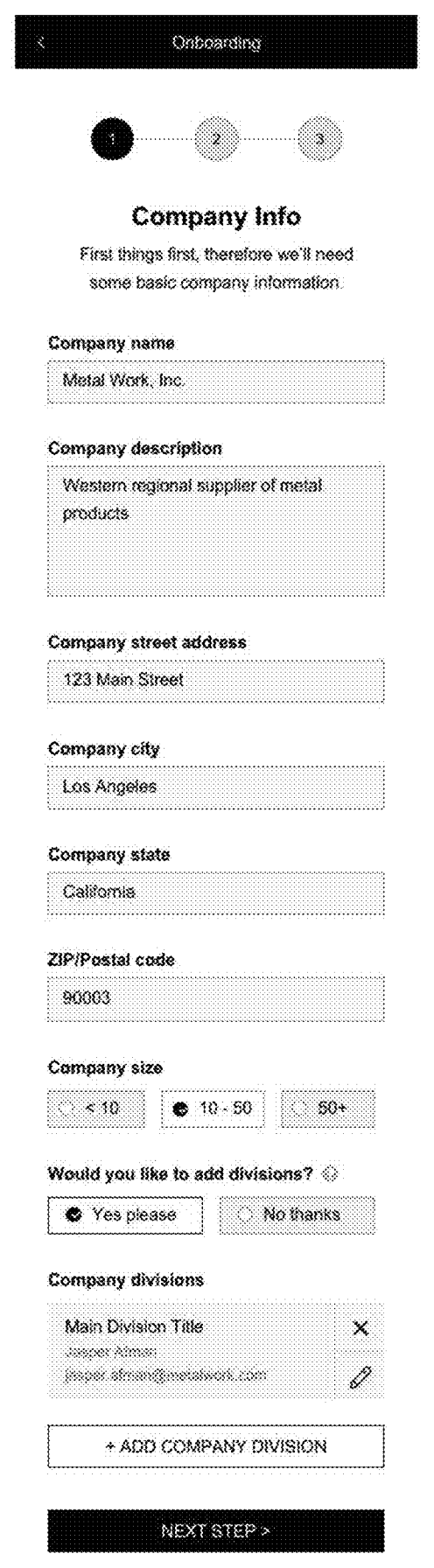
Figure 8:
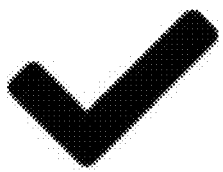

FIG. 5 illustrates a user interface enabling a company to add information for the company division, including an email address for the DA for that company division. By entering the email address of the DA, an onboarding email can be automatically sent that will invite the DA to complete their own onboarding process. FIG. 6 illustrates a completed company profile, also showing the first Company Division, with the option to continue to add additional company divisions. FIG. 7 illustrates an onboarding screen for the CA, who is the primary contact for the company and has the highest level of administrative rights on the supplier engagement system 200. FIG. 8 illustrates a success screen for the initial company onboarding process, with the option for the CA to select whether or not they are also serving as a Building Product Expert (BPE).

There is an important clarification in the notation on this screen regarding the definition of a BPE. The term "Building Product Expert" ("BPE") is not a conventional identity in the building industry. Most Building Product Manufacturers (BPM's) have product representatives who use any one of a number of job titles, including Product Rep, Architectural Rep, Architectural Sales, and Product Sales, among others. However, not all product representatives possess adequate knowledge to be considered an expert in their product genre. Architects and Design Professionals (A/DPs) prefer to speak with experts rather than sales people; so, rather than allowing all product representatives to join the supplier engagement system 200, CA's and DA's are encouraged to internally contemplate who and how many of their product representatives qualify as true product experts, who together provide coverage of the company's geographical territories.

Figure 10:
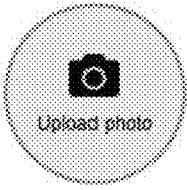

FIG. 9 illustrates an example of the initial onboarding screen for adding a BPE. Again, the supplier/manufacturer (BPE) interface processing module 210 can control the display and data capture of the user interface. FIG. 10 illustrates an additional onboarding screen for adding a BPE, which can be initially filled out in a complete form, or in part, by the CA and/or DA, prior to being sent to the BPE for completion. In an example embodiment, the required fields can include name, title of BPE, email address, and phone number. The email address information allows the supplier engagement system 200 to automatically send the profile page to the BPE later in the process for further review and completion, upon the CA or DA selecting the "ADD BPE" button, (e.g., see FIG. 16). The CA and/or DA (if any) may also use this screen to initiate the "ADD PRODUCT SECTION" function, which can allow for the definition of those product sections in which the BPE represents and possesses product expertise.

FIG. 11 illustrates the Add Product Section screen, which allows the CA and/or DA to complete information about the specific product sections in which the BPE represents and possesses product expertise. Note that in the example of the Add Product Section screen shown in FIG. 11, reference is made to the MasterFormat® format. MasterFormat® is a well-known master guide building and construction specification system used within the United States by architects, engineers, landscape architects, and interior designers to express results expected in a building project. The Construction Specifications Institute (CSI), the MasterFormat®/CSI Divisions, Sections, and Sub-Sections are key information elements, referenced as specific product sections, which are used when filtering and matching BPEs with A/DPs. Additionally, the Add Product Section screen includes options for a product section description, keywords, product names, and provides a tool for adding primary and secondary geographical territory options, which are also used to match A/DPs and BPEs based on the location of the A/DPs project city or region.

Figure 12:
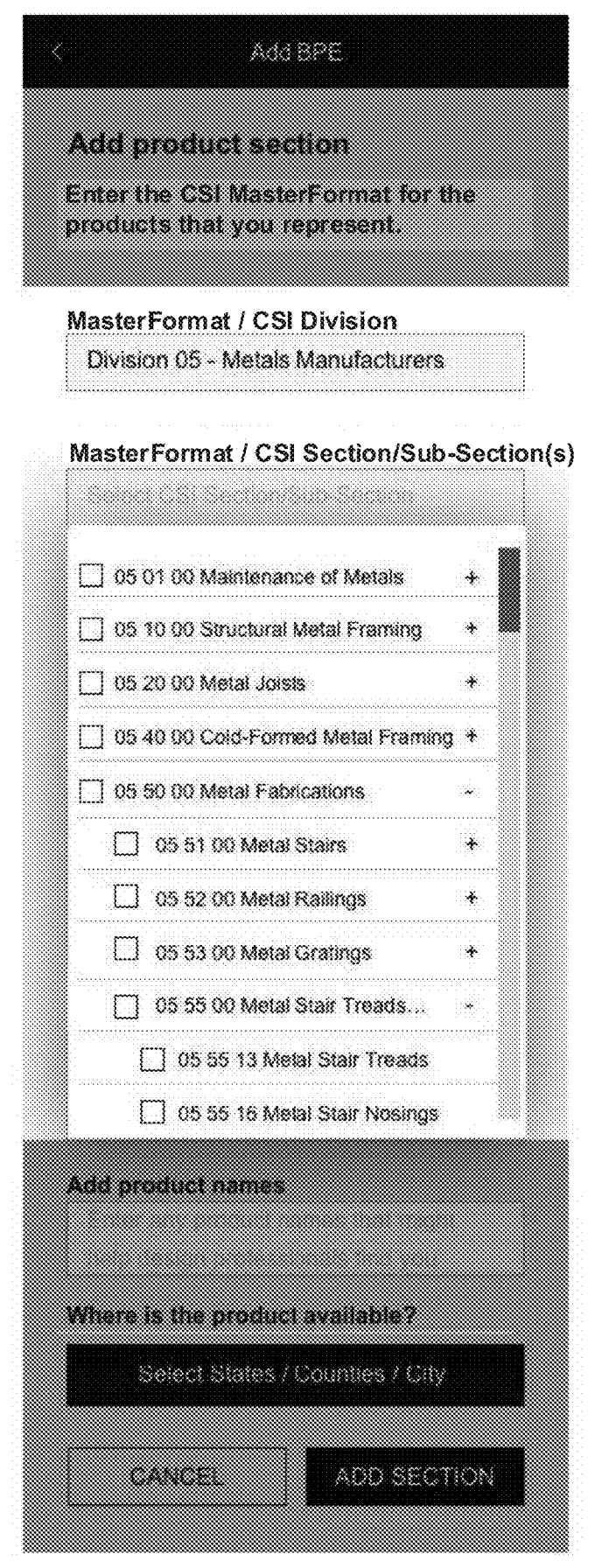

FIG. 12 illustrates the Add Product Section screen showing partial completion, including a drop-down multi-pick list of MasterFormat®/CSI or product sections, which are auto-populated after a MasterFormat®/CSI Division field is completed. For example, by selecting "Division 05" in the MasterFormat®/CSI Division field, all of the product sections and sub-sections under Division 05 are shown, allowing the CA and/or DA to select one specific product section, and one or more sub-section(s), as appropriate to best identify the correct information associated with the expertise of the particular BPE.

Figure 13:
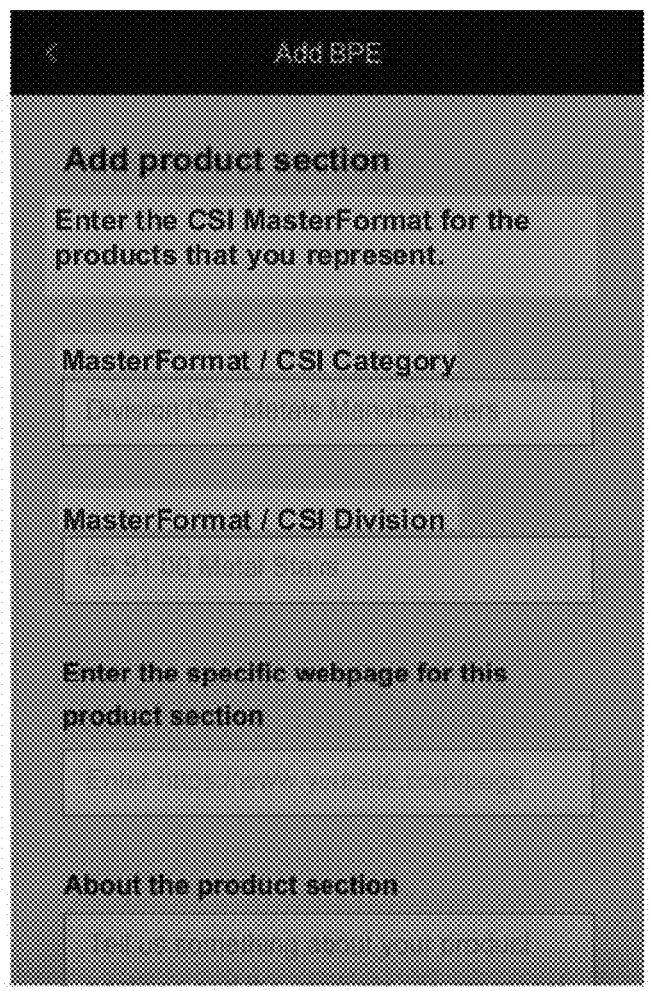

FIG. 13 illustrates the Add Product Section screen showing the pop-up tool for selecting the primary and secondary product territories, which can include state, county, city, or other regional options. This feature enabling specification of the primary and secondary product territories allows the supplier engagement system 200 to develop and populate the supplier engagement system database 112 with specific geographical territories associated with specific BPEs, which is a fundamentally unique asset in the building industry. These territories are not simply sales territories for building product manufacturer sales representatives. Rather, these territories represent primary and secondary territories associated with particular "expert" BPEs, which often differ significantly from sales territories. For example, a company might have 20 sales reps across the U.S., each with a unique "sales territory", resulting in a total of 20 sales territories for the company. However, if the company determined internally that only four individuals among their sales reps qualify as BPEs, those BPEs would likely have far fewer total territories among them, while achieving the same coverage as the company's 20 sales reps. Thus, the BPE territories, both primary and secondary, are unique in the industry as representing the specific geographical territories associated with specific BPEs and their associated product expertise.

Figure 14:
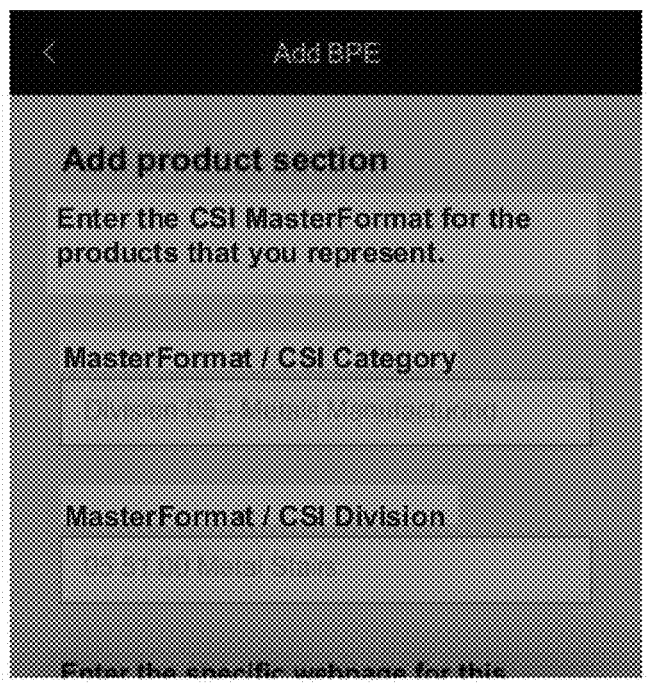

FIG. 14 illustrates the Add Product Section screen showing a pop-up tool that appears after the primary territory selection is completed in the previous screen (e.g., see FIG. 13). Note that when selecting the secondary territory, the list shows options available for selection that are in addition to the primary territory selections, as the primary selections are shown as greyed out, and are unable to be clicked. The purpose of the secondary market represented by the secondary territory selections is to allow for a greater reach by each BPE to be matched with appropriate A/DPs when the BPEs primary territory is not inclusive of the A/DPs specific city or region. As part of its matching function, the supplier engagement system 200 can place a higher degree of relevance on the primary territory and a lesser degree of relevance on the secondary territory. All of the cities and regions included under the primary and secondary territories as selected for specific BPEs are retained in the supplier engagement system database 112. The specified territories can be expanded to include specific latitude/longitude location data, in order to match BPE territories with A/DP project cities/regions by proximity, if an A/DPs search comes up with no direct matches in the first iteration of the matching process.

FIG. 15 illustrates the Add BPE onboarding screen, showing partial completion by the CA and/or DA. A headshot photograph can be uploaded to the BPE profile, if available to the CA and/or DA. Regardless of whether the photo is in color or black and white, the supplier engagement system 200 can convert the photo to black and white for consistency across all BPE profiles. This screen also shows a completed product section (e.g., Metal/05 51 00—Metal Stairs), and allows the CA or DA to edit or delete that product section. The CA or DA can also add an additional product section(s). When complete, the CA or DA can select the ADD BPE button to complete the first stage of the BPE onboarding process.

Figure 16:
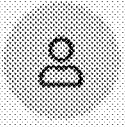
Figure 17:
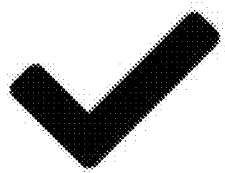

FIG. 16 illustrates another example of the BPE onboarding screen showing the addition of an initial BPE profile (e.g., Jasper Afman), whether partially or completely filled out, with the option to delete or edit the profile. Additionally, the CA and/or DA may choose to add an additional BPE, or they can select the PREVIOUS button to move backwards to the previous screen, or the FINISH button to complete the BPE onboarding process. Upon selection of the FINISH button, an email can be automatically sent to the BPE or BPEs, for their review and further completion, if needed. After the BPE has completed their input for the onboarding process, to the best of their ability, their BPE profile can be sent in a BPE Details screen to the CA and/or DA for final review and approval. FIG. 17 illustrates the Onboarding completion screen. This screen signals the completion of the onboarding process for the CA and/or DA; however, each will be able to continue to view and edit BPE profiles from their own CA or DA Administration page.

Figure 18:
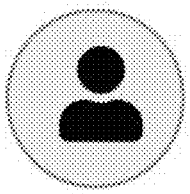
Figure 19:
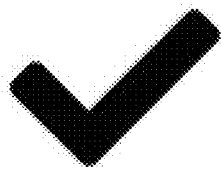

FIG. 18 illustrates an example of the BPE Details screen. This screen shows a BPE profile that has been reviewed and submitted by the BPE to the CA and/or DA for final review and/or approval. If any changes are needed, or if the CA and/or DA have suggestions or comments for the BPE to address prior to final approval of the BPE profile, the CA and/or DA can select the EDIT REQUIRED button. This button will open a comment box, allowing the CA and/or DA to attach the comments to the edit request, so the BPE may have a better understanding of what needs to be completed and/or modified. The screen also allows the CA and/or DA to give final approval by selecting the APPROVE button. FIG. 19 illustrates the BPE Details completion screen. Once a BPE is added, the CA and/or DA can click the GO TO OVERVIEW button, and be taken to their own Administrator dashboard.

Figure 20:

FIG. 20 illustrates an example of the initial Architect and Design Professional (A/DP) Onboarding screen. In this set of user interface screen examples, the designer (A/DP) interface processing module 220 can control the display and data capture of the user interface. The initial A/DP Onboarding screen allows an A/DP to complete their basic information, including a password. The note at the top of the screen is a link to an explanation of how the information is used, and who can see the information. Representatives of the supplier engagement system 200 are committed to maintaining the highest degree of information security, allowing the A/DP to control what information is shared, and with whom, including tools for the A/DP to conduct communications with BPEs in either an open/non-masked communications mode or in a veiled/masked communications mode, which limits or prevents the visibility of their personal and company and project information (private information) by the BPEs. The initial A/DP Onboarding screen is for entry of the individual A/DPs information. Subsequent screens allow the A/DP to add their company information.

FIG. 21 illustrates another A/DP Onboarding screen, which allows an A/DP to upload a photo. Regardless of whether the photo is in color or black and white, the supplier engagement system 200 can convert the photo to black and white for consistency across all A/DP profiles. A/DPs can move backwards or on to the next step in the A/DP onboarding process by using the PREVIOUS and NEXT buttons, respectively.

Figure 22:
Figure 23:
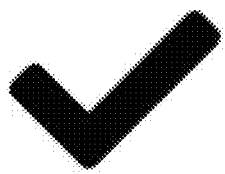

FIG. 22 illustrates another A/DP onboarding screen, which allows the A/DP to enter basic information for their company. The supplier engagement system 200 can be pre-populated with extensive data on companies, both BPMs and A/DPs. The company field in the A/DP onboarding screen can be a smart search window that will auto-populate options from which the A/DP can select, if their company information is already in the system. A/DPs can modify the pre-populated information by directly editing each field, as needed. Some A/DP companies have multiple locations in multiple cities. The company name and company city fields are used together to constitute a unique A/DP office identifier (ID). The company size options are for internal notation only to help representatives of the supplier engagement system 200 to better serve the A/DP community. A/DPs can move backwards or on to the next step in the A/DP onboarding process by using the PREVIOUS and NEXT buttons, respectively. Upon selecting the NEXT button, an email is automatically initiated and sent to the A/DP, welcoming them to the supplier engagement system 200. FIG. 23 illustrates the A/DP onboarding success screen. This screen is shown after the A/DP has completed their own onboarding process. The LET'S GO button will take the A/DP to the primary search screen shown in FIG. 24.

Figure 24:

FIG. 24 illustrates the A/DP New Search screen in an example embodiment. This screen allows the A/DP to enter information about the building project on which they are working and for which they need specific building product/material information. The A/DP can also specify the product genre for which they are seeking communication with a building product expert(s). The project name field 2410 is used to create a project folder, into which all of the future activity related to the project can be managed and viewed by the A/DP, exclusively. The project city field 2412 (or other project geographical location) is used as a primary basis for searching and matching with BPEs who actually do business in the specific area of the project (not the A/DPs office city). This is an important distinction in the building industry that has an important and positive impact on an A/DPs project success. The project city field 2412 is a smart field that can use the supplier engagement system database 112 to auto-populate city/state options as the A/DP begins to enter the city name. The project type field 2414 is also a smart field that can use the supplier engagement system database 112 to provide auto-fill options as the A/DP begins to enter the project type. Both the project city and project type fields 2412/2414 are structured (e.g., limited to enumerated options), in order to maintain the integrity of search options used for matching A/DPs with BPEs. The product section field 2416 is an important field for the matching function of the supplier engagement system 200. The product section field 2416 enables the A/DP to specify the building product genres about which the A/DP needs information. These building product genres can correspond to the specific product sections in which the BPE represents and possesses product expertise as described above. As the A/DP begins to type in the smart project city field 2412, the smart project type field 2414, and the product section field 2416, the supplier engagement system 200 uses an Elasticsearch™ process, in a particular example embodiment, to correlate and match the text entered in the smart project city field 2412, the smart project type field 2414, and the product section field 2416 with MasterFormat® CSI Sections specified in the BPE screens described above. The supplier engagement system 200 provides an auto-populated drop-down list of related MasterFormat® CSI Sections, allowing the A/DP to select the one that most closely matches their search intent. In the add product name, manufacturer name, and keyword field 2418, the A/DP can enter as much or as little additional information as they wish. The text field 2418 allows for multiple words and phrases to be entered, separated by commas, and can include product name and manufacturer name, as well as keywords that might help to describe the A/DPs search intent. Once the search field data entry is completed, the A/DP can select the SEARCH FOR PRODUCT EXPERTS button to initiate the search/match process.

Figure 25:
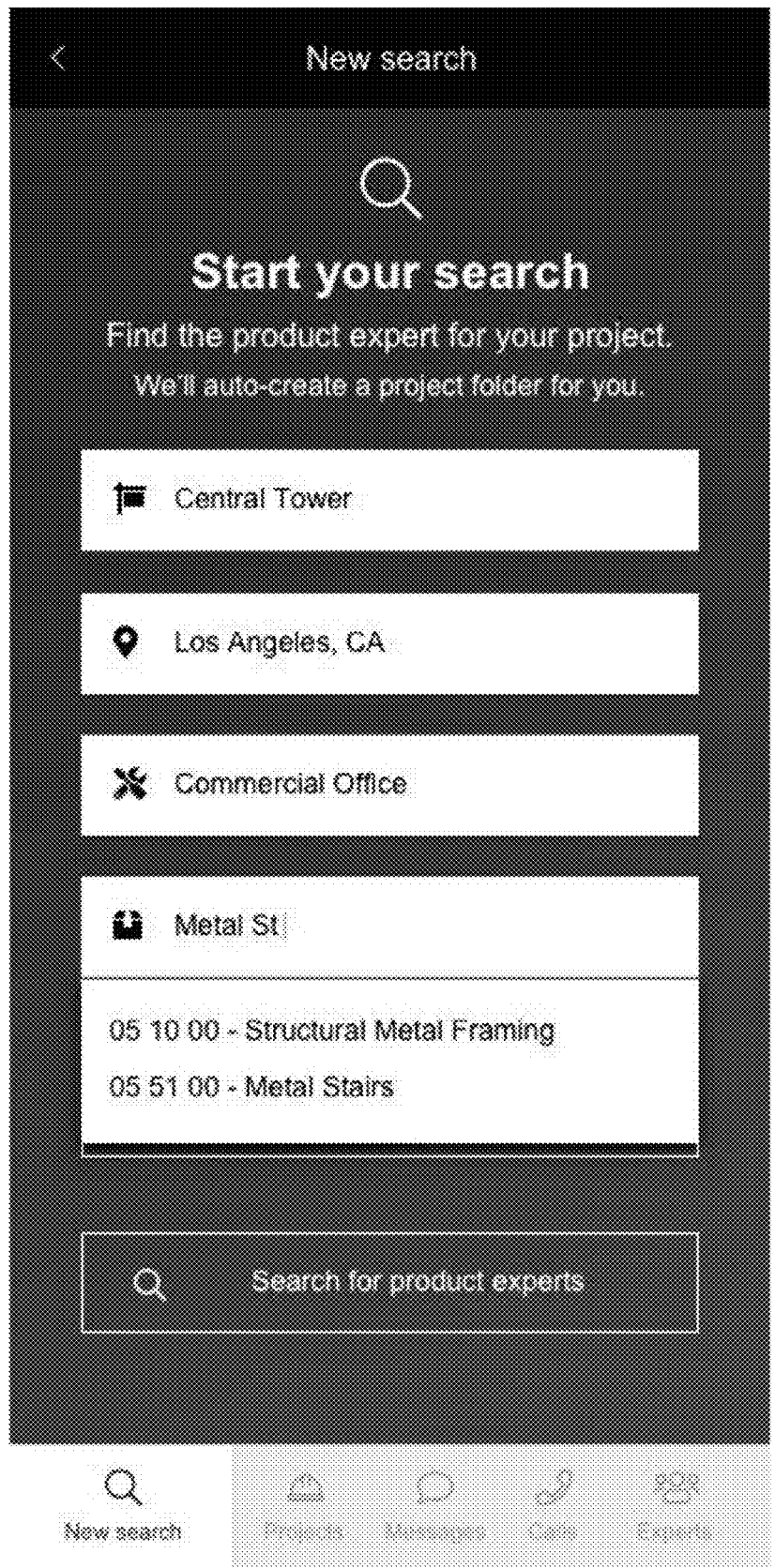
Figure 26:
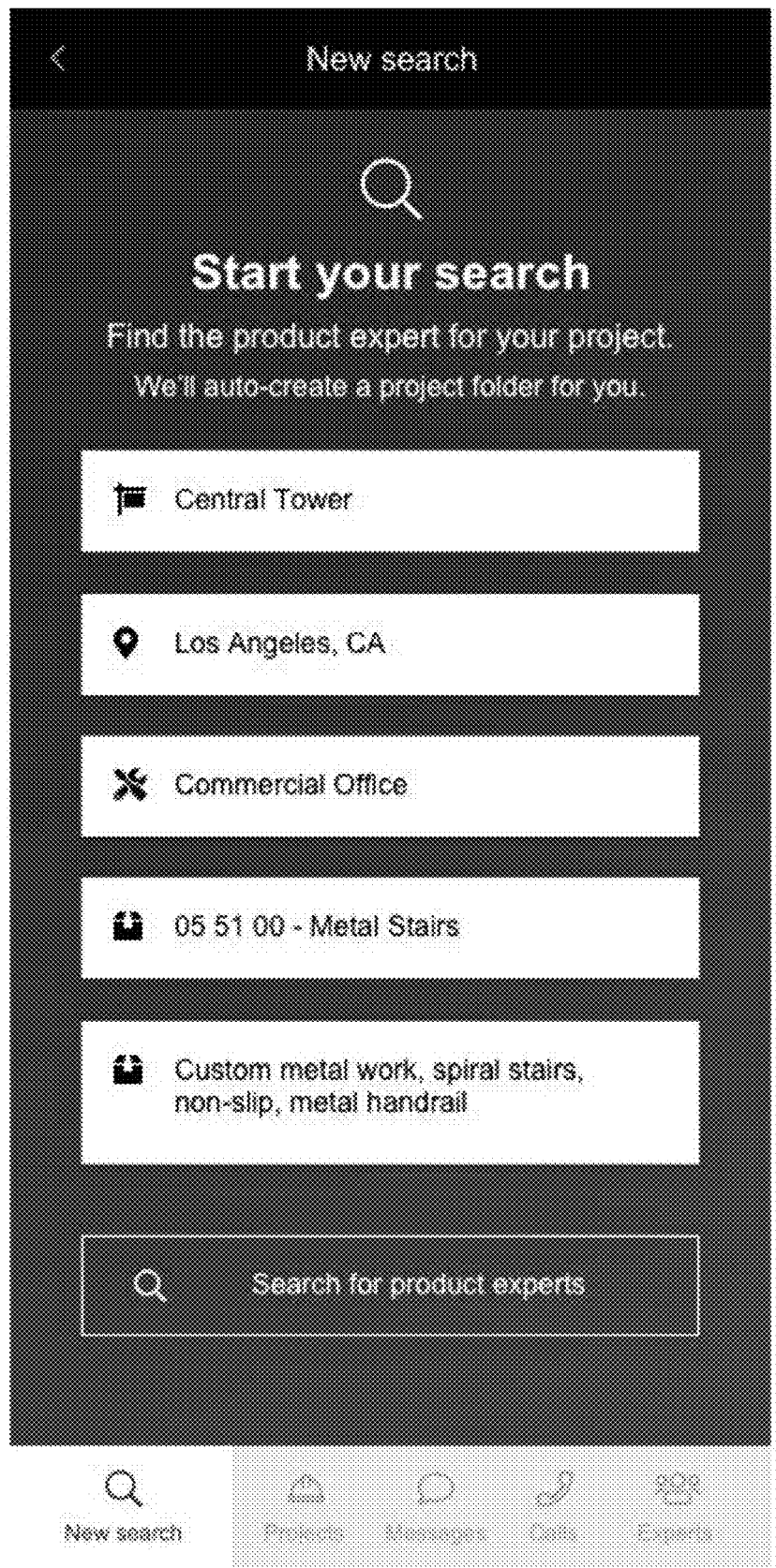

FIG. 25 illustrates an example of the A/DP New Search screen showing partial completion by the A/DP. In the example shown, the project name field is populated by the A/DP as "Central Tower", although the A/DP could use any name they wish, including a generic project name of "Project 1" or a project number "0190823.1", for example. The project city and project type fields are completed, and the A/DP has typed a portion of the product section field input. As shown, when the A/DP enters even a partial entry, the field is auto-populated with drop down options, allowing the A/DP to select one of the suggested drop-down options. FIG. 26 illustrates the example of the A/DP New Search screen showing all fields as complete, after which, the A/DP can initiate the BPE search/match using the SEARCH FOR PRODUCT EXPERTS button.

Figure 27:
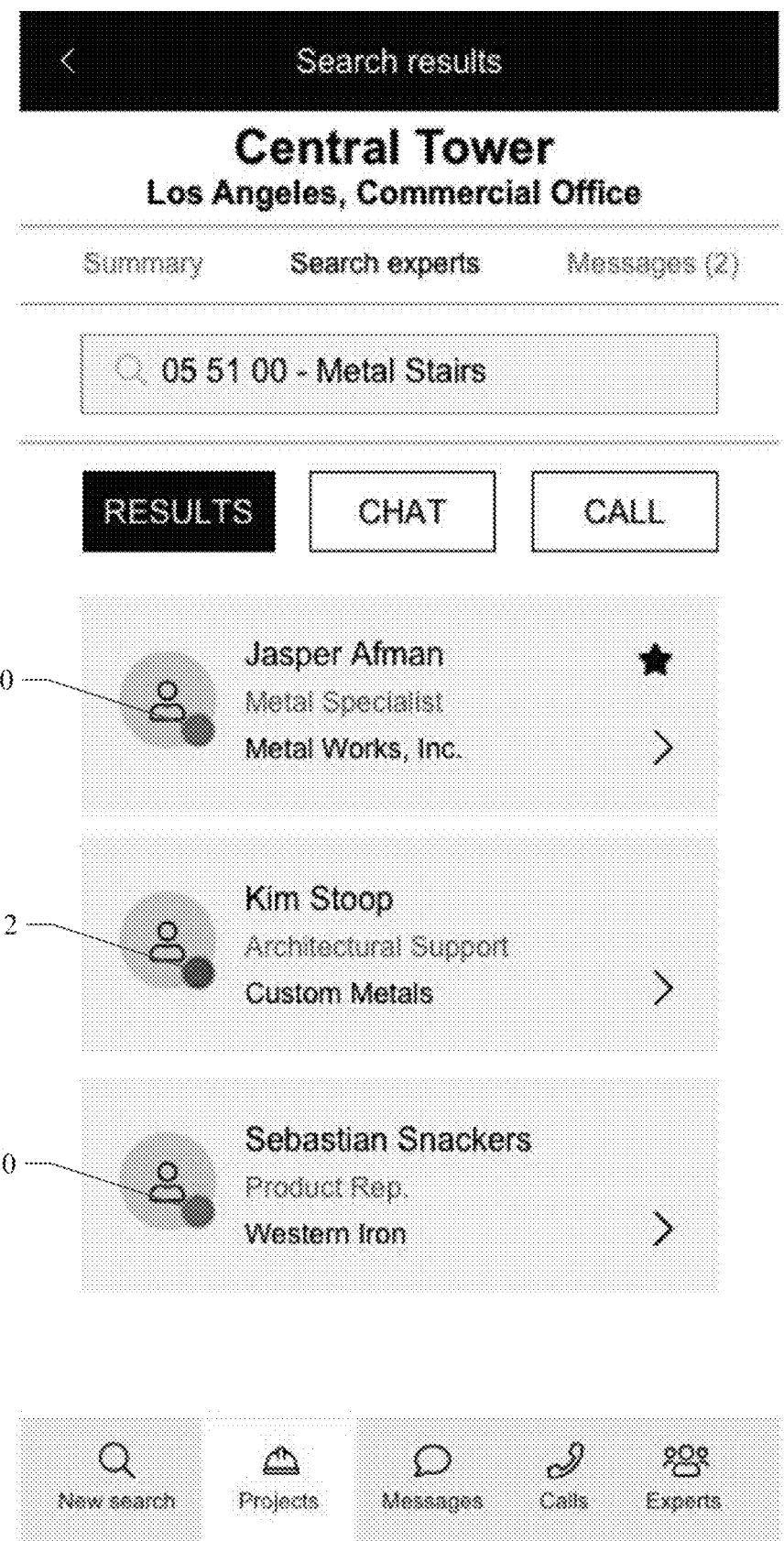
Figure 28:
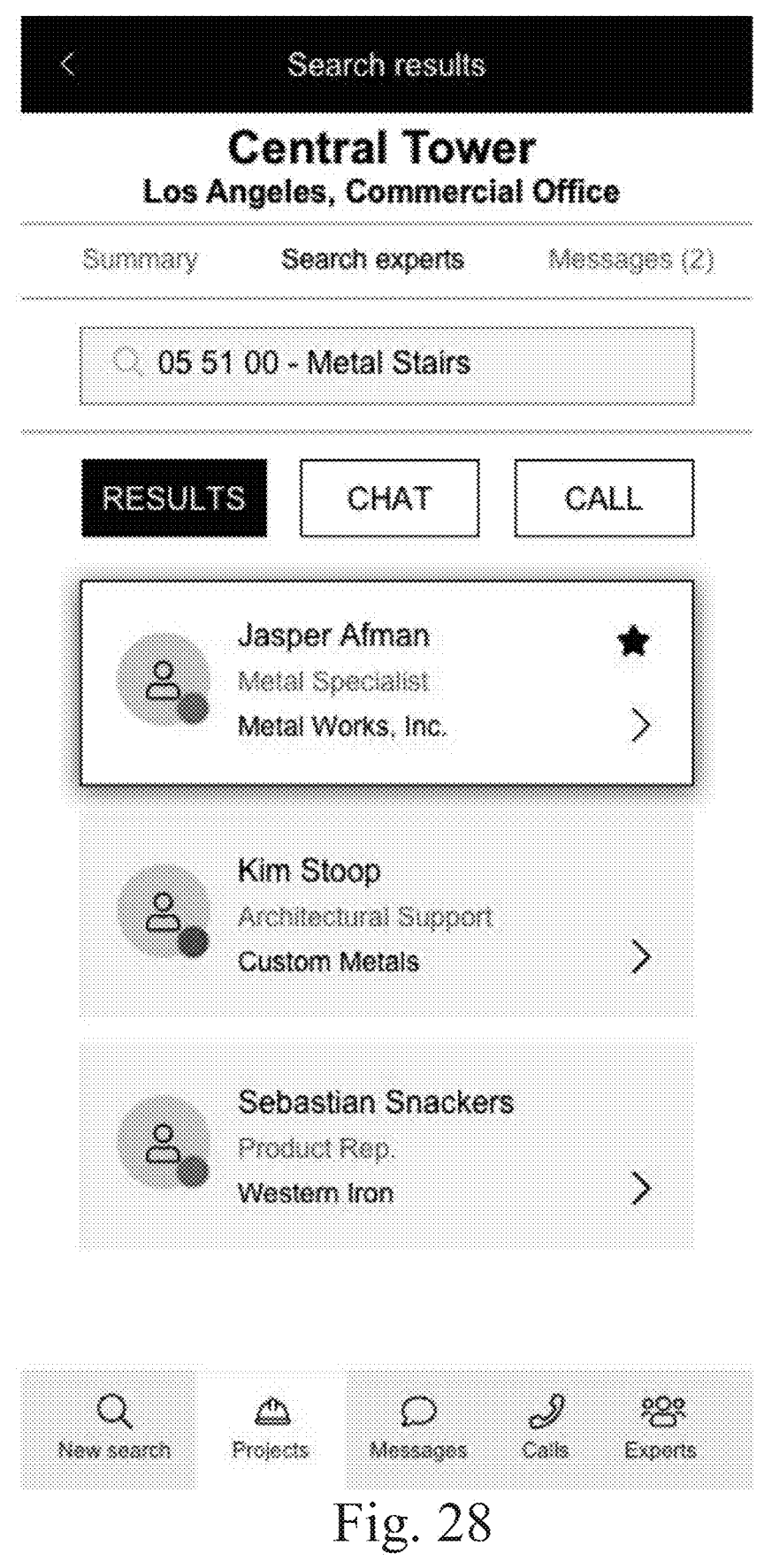
Figure 29:
Figure 30:
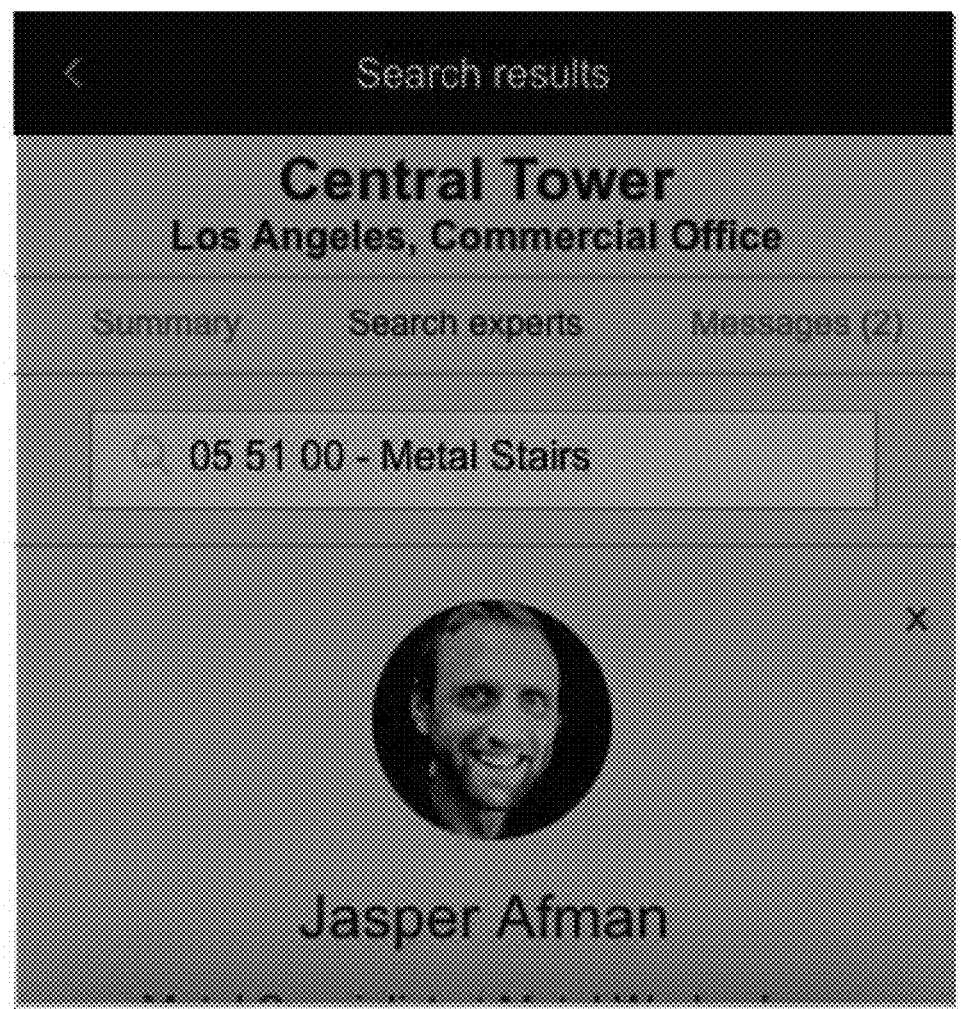

FIG. 27 illustrates an example of the A/DP Search Results screen produced from the search parameters entered in the example shown in FIG. 26. The A/DP Search Results screen shows the results of the search/match process performed by the supplier engagement system 200. The A/DP Search Results screen includes the key information previously entered in the example, as well as a short list of BPEs who most closely match the search query. The green circles 2710 show which BPEs are currently in the supplier engagement system database 112 and available to be reached in real time. The red circle 2712 indicates that the BPE is currently unavailable (e.g., away on vacation for an extended period). If a BPE is available, but away from their app at the moment, (e.g., away at a lunch break or meeting), a yellow circle would be shown in the A/DP Search Results screen. The BPEs can set their real-time availability status via their BPE dashboard (not shown). BPEs can select an active status (green circle), away status (yellow circle), or unavailable status (red circle), and can add an explanation note for both the away and unavailable status option, so A/DPs can have a more clear expectation regarding the availability of the BPE. Those status notes can be shown on the BPEs detailed profile screen. From the search results screen shown by example in FIG. 27, an A/DP can see the relevant BPEs to whom they have been matched by the supplier engagement system 200. Once the A/DP has search results showing relevant BPEs, the A/DP can use the buttons provided on the A/DP Search Results screen to initiate a number of actions, including a chat or phone call communication session with a selected BPE. The A/DP can also obtain a more detailed view of a BPEs background by selecting the ">" symbol on the right of each BPE name button. Additionally, the star symbol shown on the BPE name button for Jasper Afman in the example shown indicates that the A/DP has previously opted to choose BPE Jasper Afman as a "Trusted" BPE for future reference. The selection of a particular BPE as a "Trusted" BPE adds to the scoring when an A/DP is matched with BPEs. As a result, a "Trusted" BPE is more likely to be matched with an A/DP in future searches. The A/DP can also remove the star (and the "Trusted" BPE status) at any time. The BPE does not see or know if they have been chosen as a "Trusted" BPE, or not. The A/DP can also choose to initiate a new product search using the A/DP Search Results screen near the top of the screen. The A/DP can also navigate to other screens within the same project using the top options (Summary, Search experts, and Messages). The A/DP can also activate additional functions using the options at the bottom of the A/DP Search Results screen (e.g., New Search, Project, Messages, Calls, and Experts). FIG. 28 illustrates the A/DP Search Results screen showing the selection of BPE Jasper Afman, allowing the A/DP to view Jasper's Detailed Profile. FIG. 29 illustrates the BPE Detailed Profile screen, showing additional information about the BPE. From this screen, the A/DP can initiate a chat or phone call communication session with a selected BPE. The A/DP can also select the VIEW PRODUCTS button to view additional product-related information about which the selected BPE is an expert. FIG. 30 illustrates another example of the BPE Detailed Profile screen showing a pop-up that appears after the A/DP selects the VIEW PRODUCTS button as shown in the previous screen (e.g., see FIG. 29). The links shown in the pop-up of FIG. 30 will take the A/DP to a new window, and will call on a specific web page, which the BPE has previously associated with each product section they represent (e.g., see FIG. 11). The pop-up window can be closed using the "X" symbol in the upper right-hand corner of the pop-up to return the A/DP to the BPE Detailed Profile screen (e.g., see FIG. 29). Once the pop-up is closed, the A/DP can return to the search results list by clicking on the "X" symbol located at the upper right hand corner of the BPE Detailed Profile screen (e.g., see FIG. 29).

Figure 31:
Figure 32:
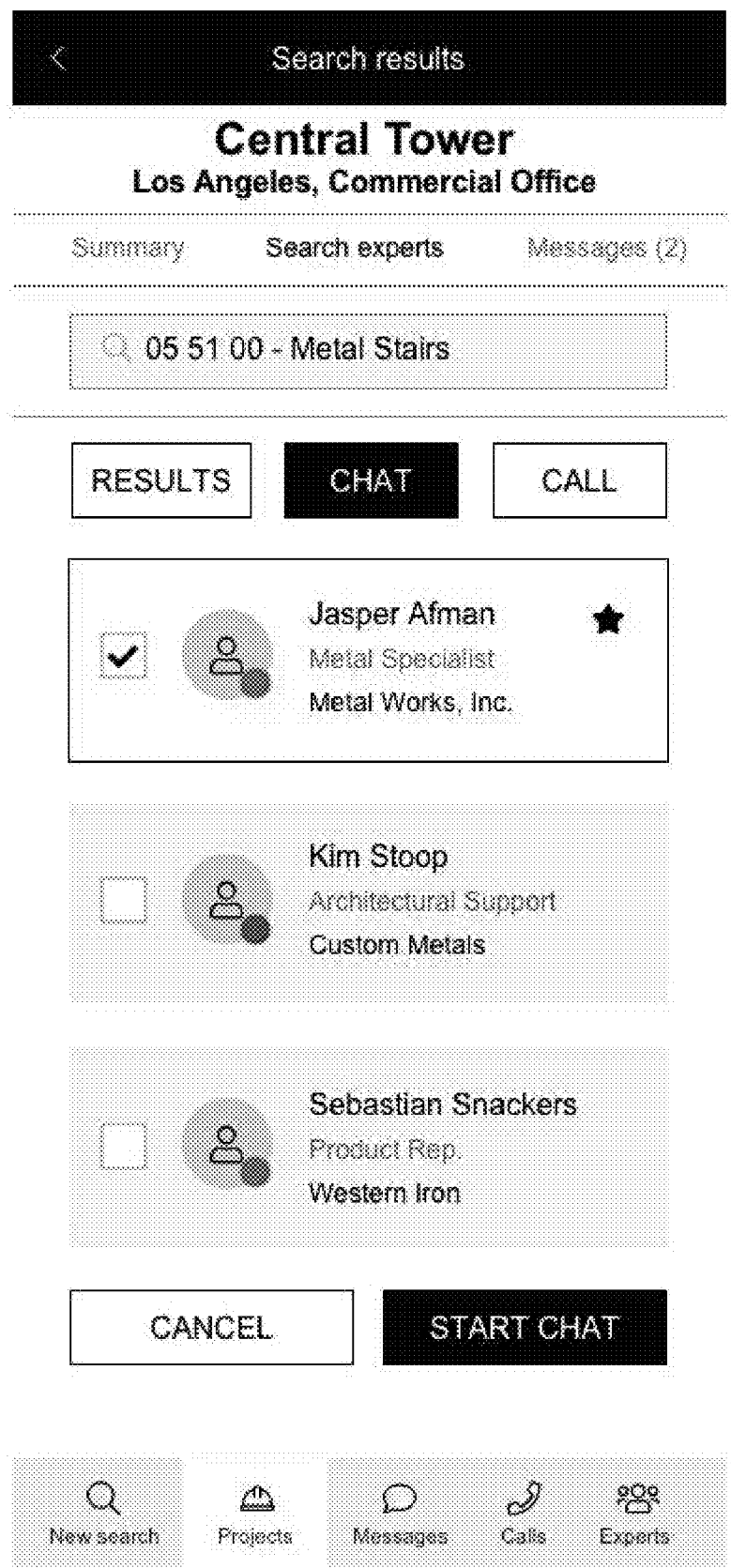
Figure 33:
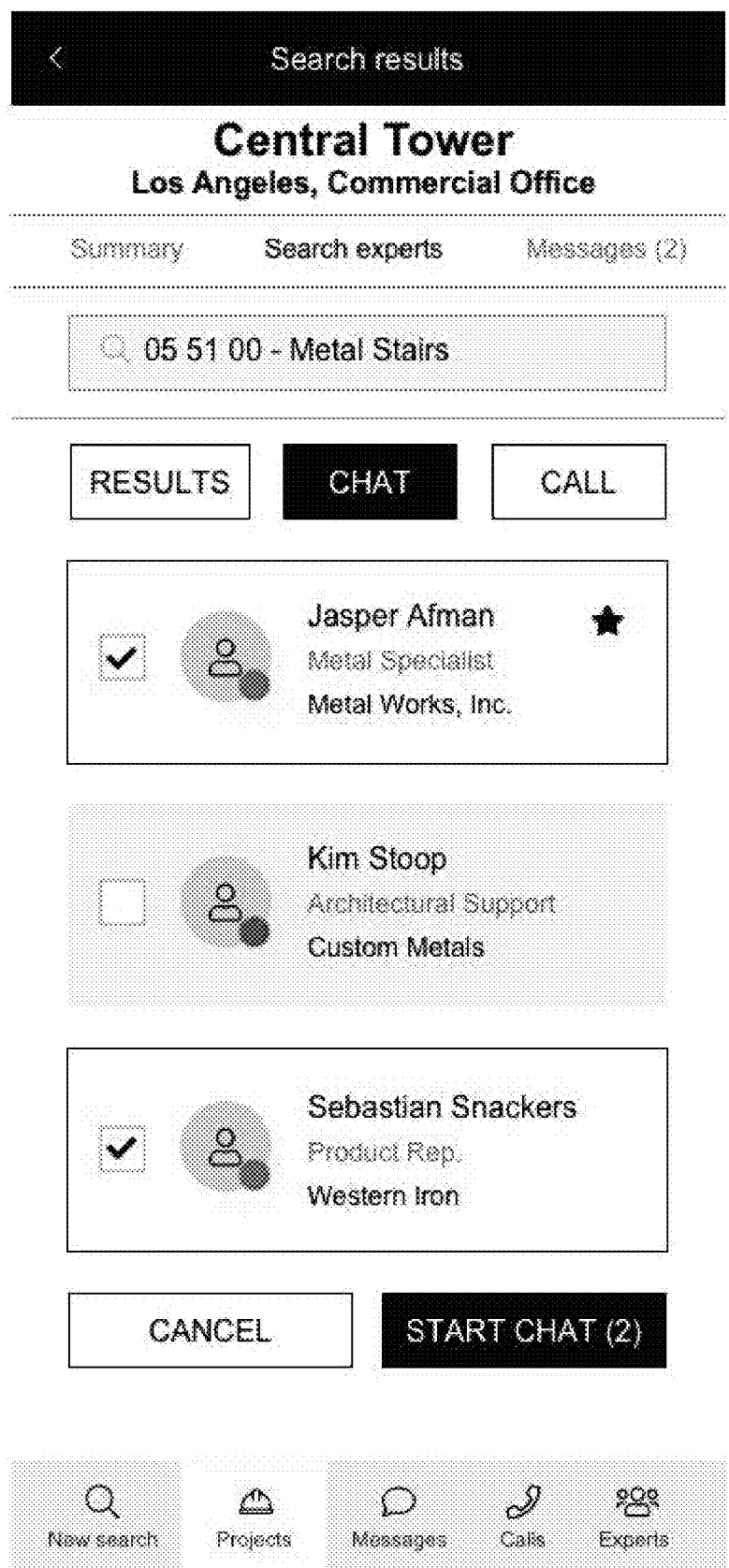

FIG. 31 illustrates another example of the A/DP Search Results screen, showing the selection of the CHAT button. Upon selecting the CHAT button, a series of boxes appear to the left of all BPEs, allowing the A/DP to select one or more BPEs with whom to initiate a chat session. The option for initiating a chat session with multiple BPEs at once is a highly valued feature among A/DP users. A/DPs typically need to reach out to multiple BPEs and in normal practice, they must initiate multiple separate inquiry efforts, using various methods of connecting, from web forms, to emails, phone calls and messages, often repeating the same information in the inquiry. Using those other traditional methods typically exposes the A/DPs contact and project information to the BPEs, often resulting in unwanted follow-up by the BPEs. FIG. 32 illustrates an example of the A/DP Search Results Chat screen showing one BPE selected. FIG. 33 illustrates the A/DP Search Results Chat screen showing selection of a second BPE. From here, the A/DP can initiate a chat session with both selected BPEs in one action by selecting the START CHAT button.

Figure 34:
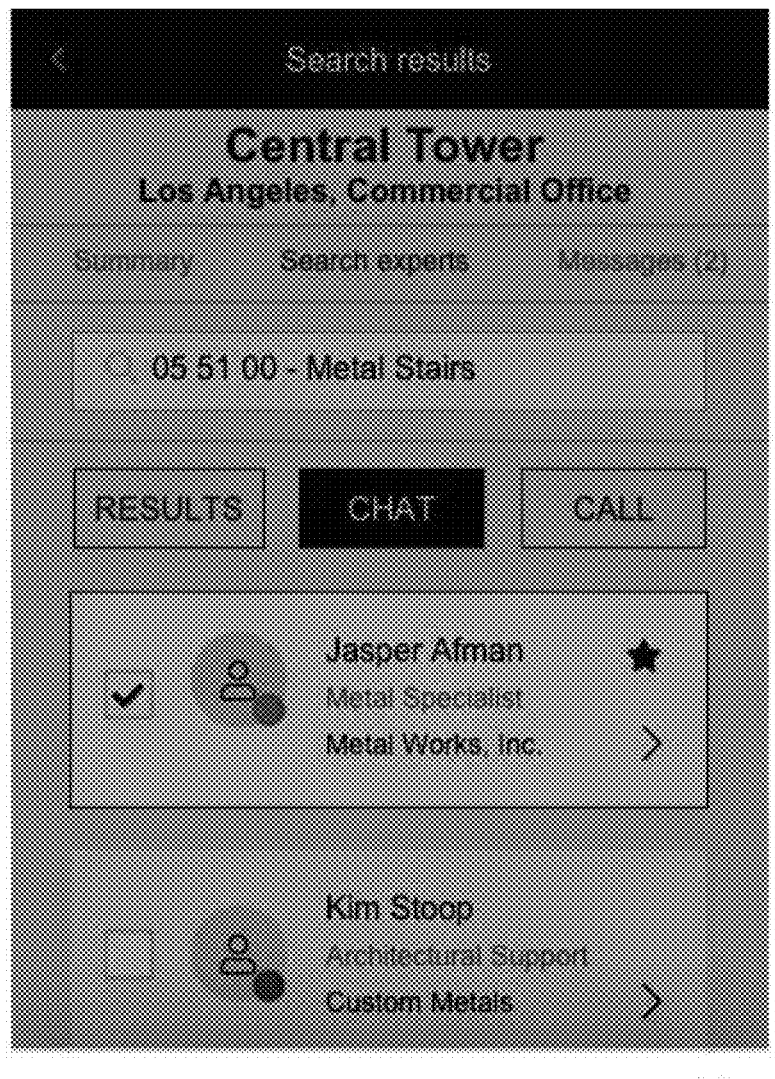

FIG. 34 illustrates the A/DP Search Results screen, showing a pop-up that allows the A/DP to select whether they want the chat to be masked or open. A masked chat will hide the A/DPs personal and project information from view by the BPE. An open chat will allow the A/DPs personal and project information to be viewable by the BPE.

Figure 35:
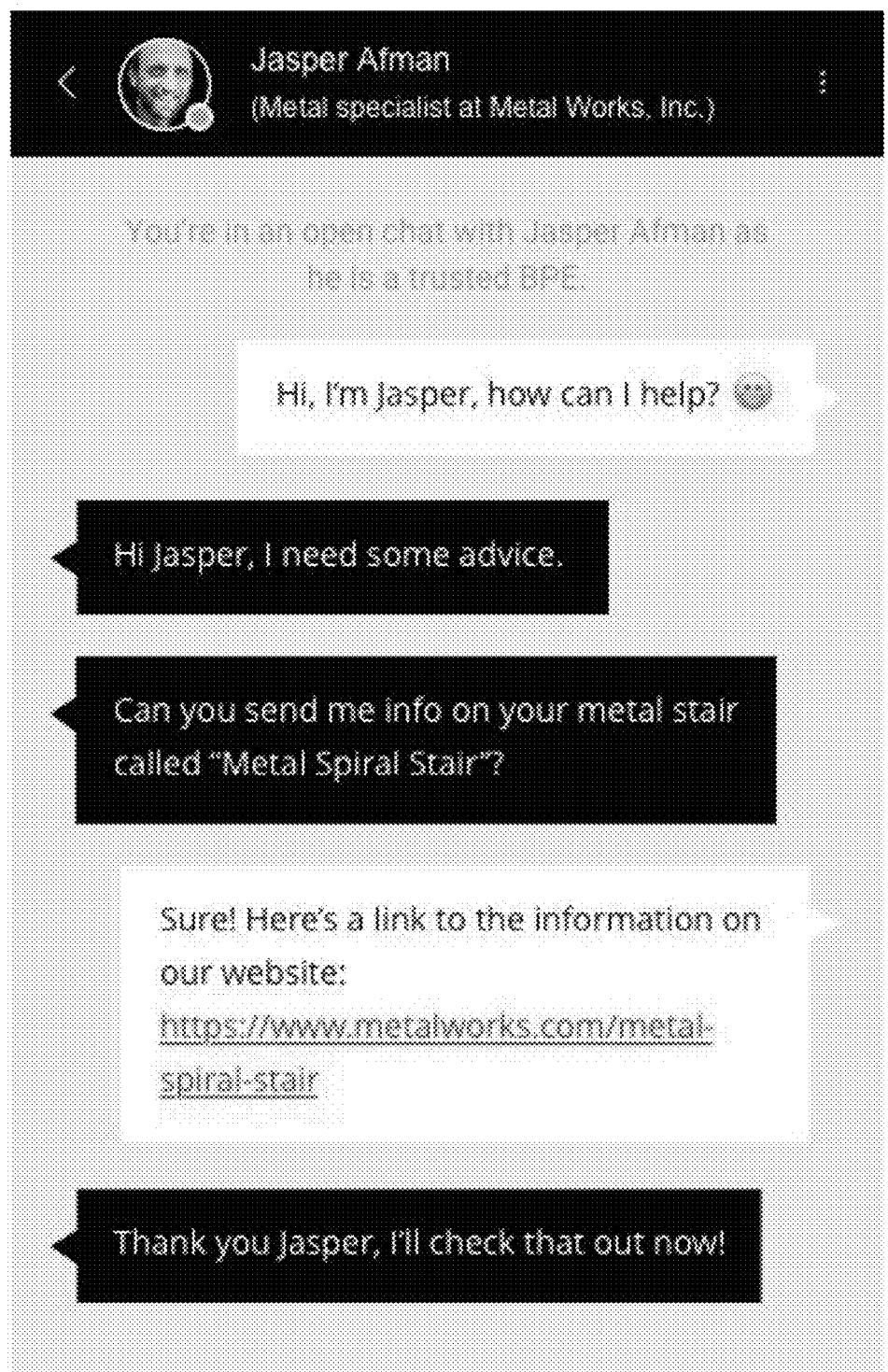

FIG. 35 illustrates an example of the Open Chat screen presented upon the A/DP selection of an open chat session. This screen enables an open (non-masked) chat session between the A/DP and a selected BPE. In another example, a Masked Chat screen can be presented upon the A/DP selection of a masked chat session. The Masked Chat screen enables a veiled (masked) chat session between the A/DP and a selected BPE. A masked chat session will hide the A/DPs personal and project information from view by the BPE. The Masked Chat screen only allows one field for the A/DP to initiate the chat to multiple BPEs, and once one or more BPEs reply, those chats will be in a one-to-one chat; however, the A/DPs personal and project information will not be shown to the BPEs. In both the Open Chat and the Masked Chat screens, the BPE information will always be visible to the A/DP. In example embodiments, the open and masked chat sessions can be facilitated by use of the anonymizing proxy server 116 or other communications server. In a particular embodiment, the chat function can be powered by Twilio®, which allows a seamless chat experience across all mobile or desktop platforms, and can include text, photos, web links, and other attachments.

Figure 36:
Figure 37:
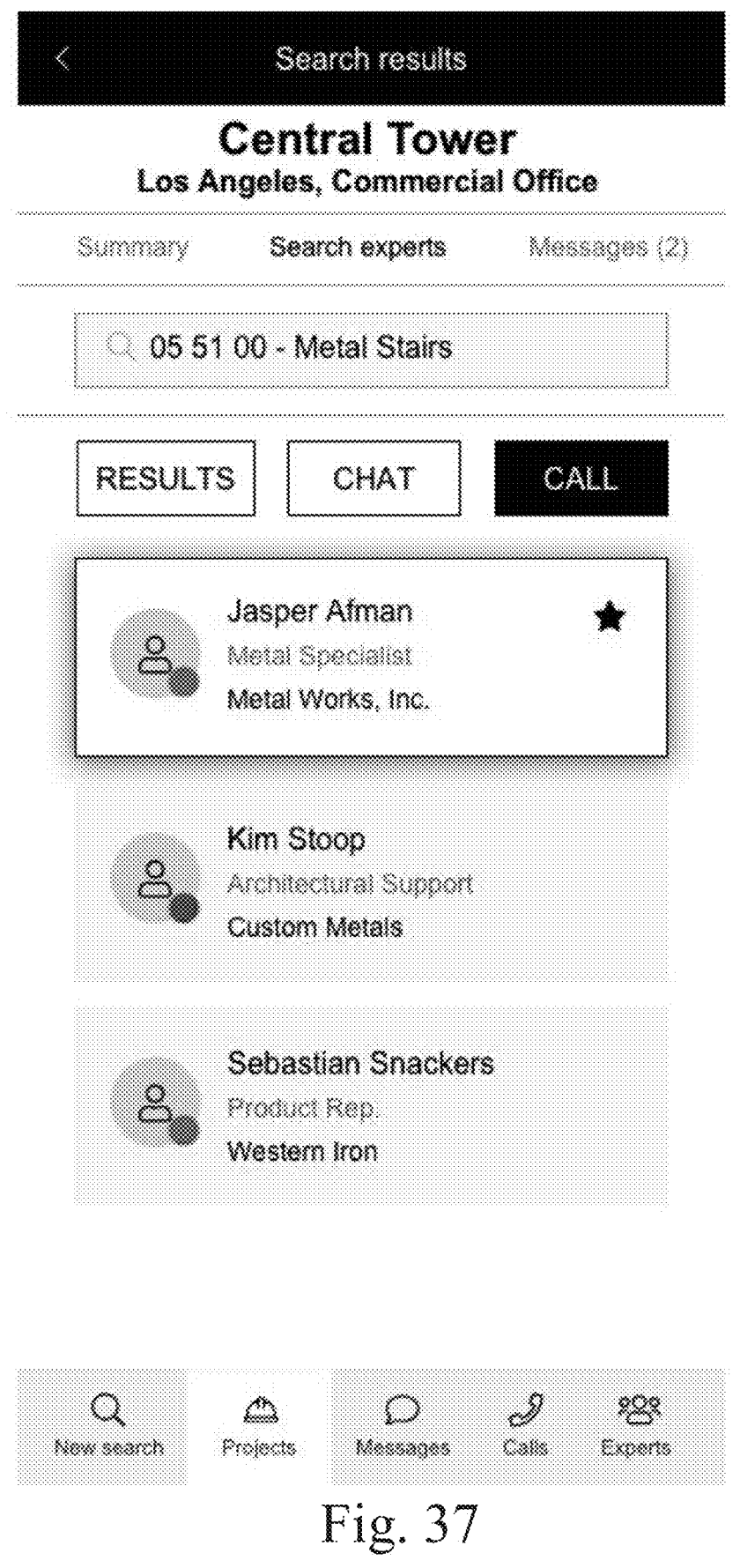
Figure 38:
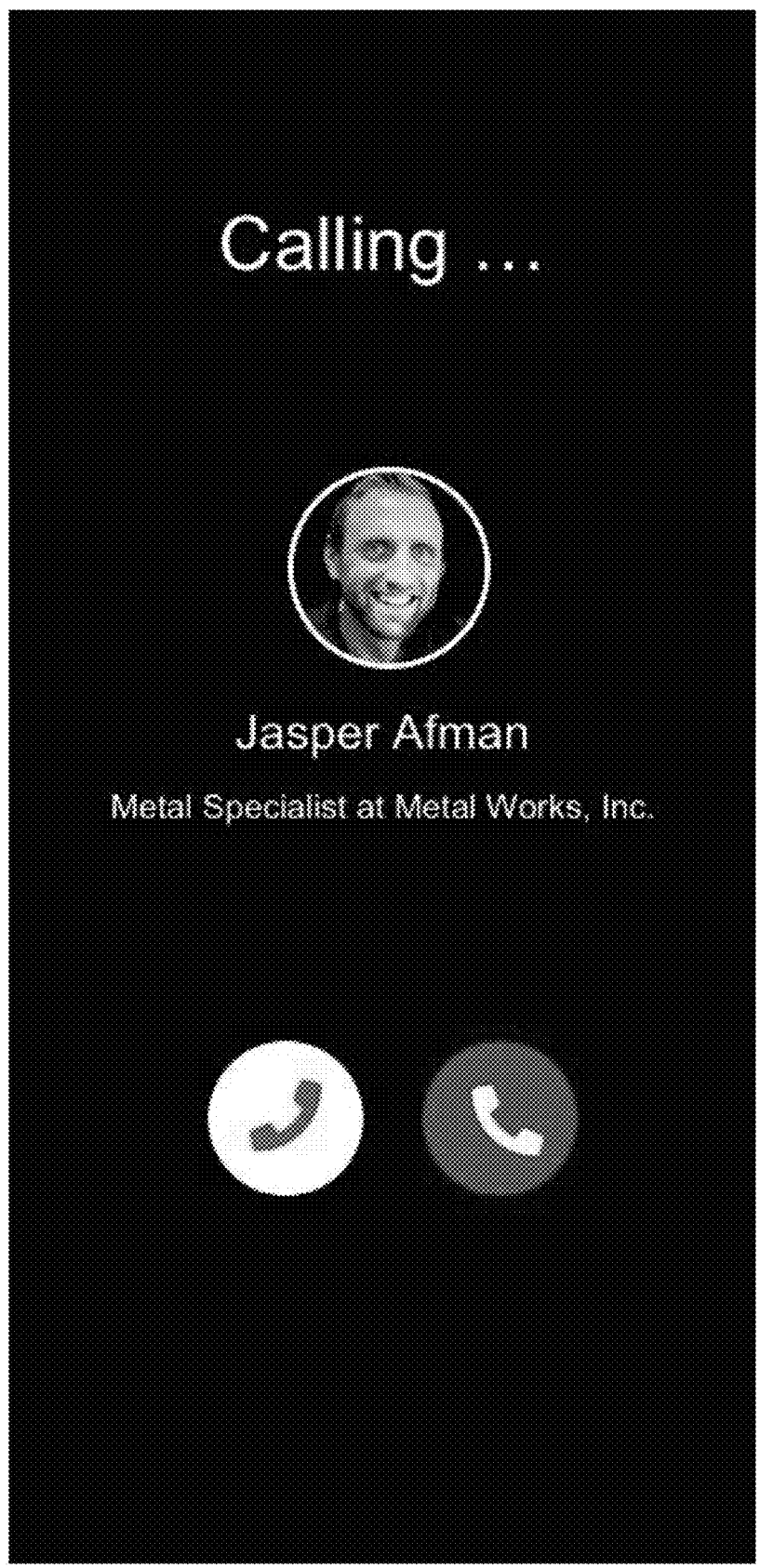
Figure 39:
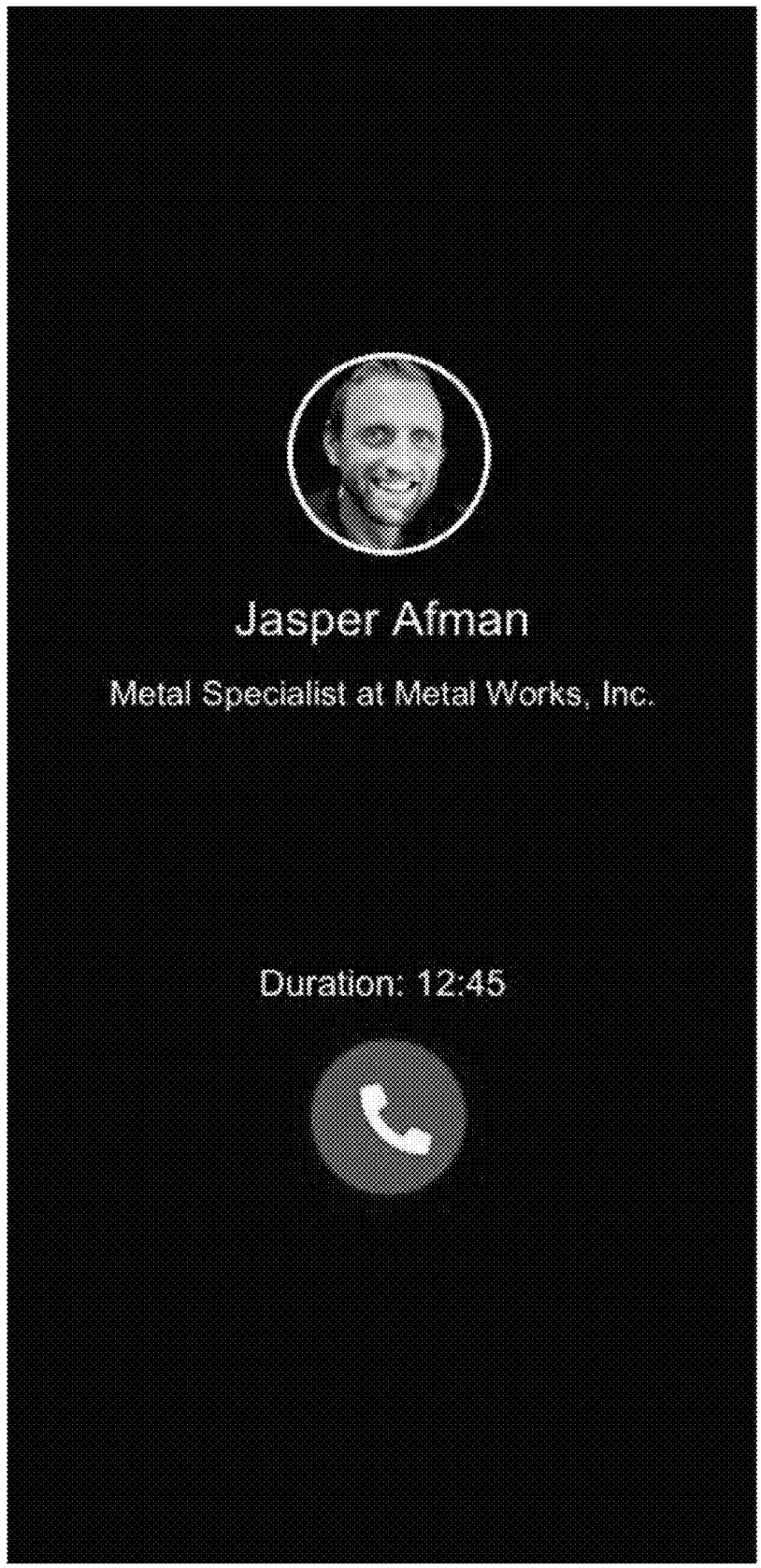

FIG. 36 illustrates the A/DP Search Results screen showing the selection of the CALL button by the A/DP. Because the example embodiment only supports calls made in a one-to-one relationship, no boxes are shown for selecting multiple BPEs. Rather, the A/DP can simply click on one of the BPE profiles to initiate a call. In the example embodiment, a call can be initiated directly on a mobile device. In a desktop implementation of the supplier engagement system 200, the A/DP can be shown a CALL NOW button that will reveal a generic phone number (not the BPEs actual phone number) that the A/DP can select to reach the particular BPE. Once the A/DP selects the generic phone number, the A/DPs unique ID will be paired with the BPEs unique ID, and a masked call can be initiated using the anonymizing proxy server 116. The use of the anonymizing proxy server 116 enables the A/DP to remain anonymous to the BPE, ensuring the A/DP will not be getting unwanted calls from the BPE in the future, unless and until the A/DP chooses to reveal their personal and project information to the BPE. FIG. 37 illustrates an example of the A/DP Search Results Call screen showing the A/DP has selected a particular BPE to call. FIG. 38 illustrates the Phone Call screen, showing the call has been initiated with the particular BPE (mobile version). FIG. 39 illustrates the Phone Call screen showing a connected, active call, as well as a call duration indicator and a button to end the call. FIG. 40 illustrates the End of Call Summary screen, which appears once a call is terminated. This screen allows the A/DP to rate the call as helpful, not helpful, or very helpful. The A/DP can also enter notes related to the call, which can be saved in the A/DPs project folder history as a call, showing the duration, the BPE, and the notes for future reference. The A/DPs project folder history can be stored in the supplier engagement system database 112.

FIGS. 41 through 48 illustrate additional examples of the features, processing, and user interface provided by various example embodiments. FIG. 41 illustrates the A/DP Project Summary screen of an example embodiment. This screen shows the summary of activity, including BPEs that have been contacted, as well as product sections that have been searched and connected. A search window at the top of the summary information allows the A/DP to enter search terms to more easily locate connected BPEs and found products, as the A/DP project folder and history grows.

Figure 42:
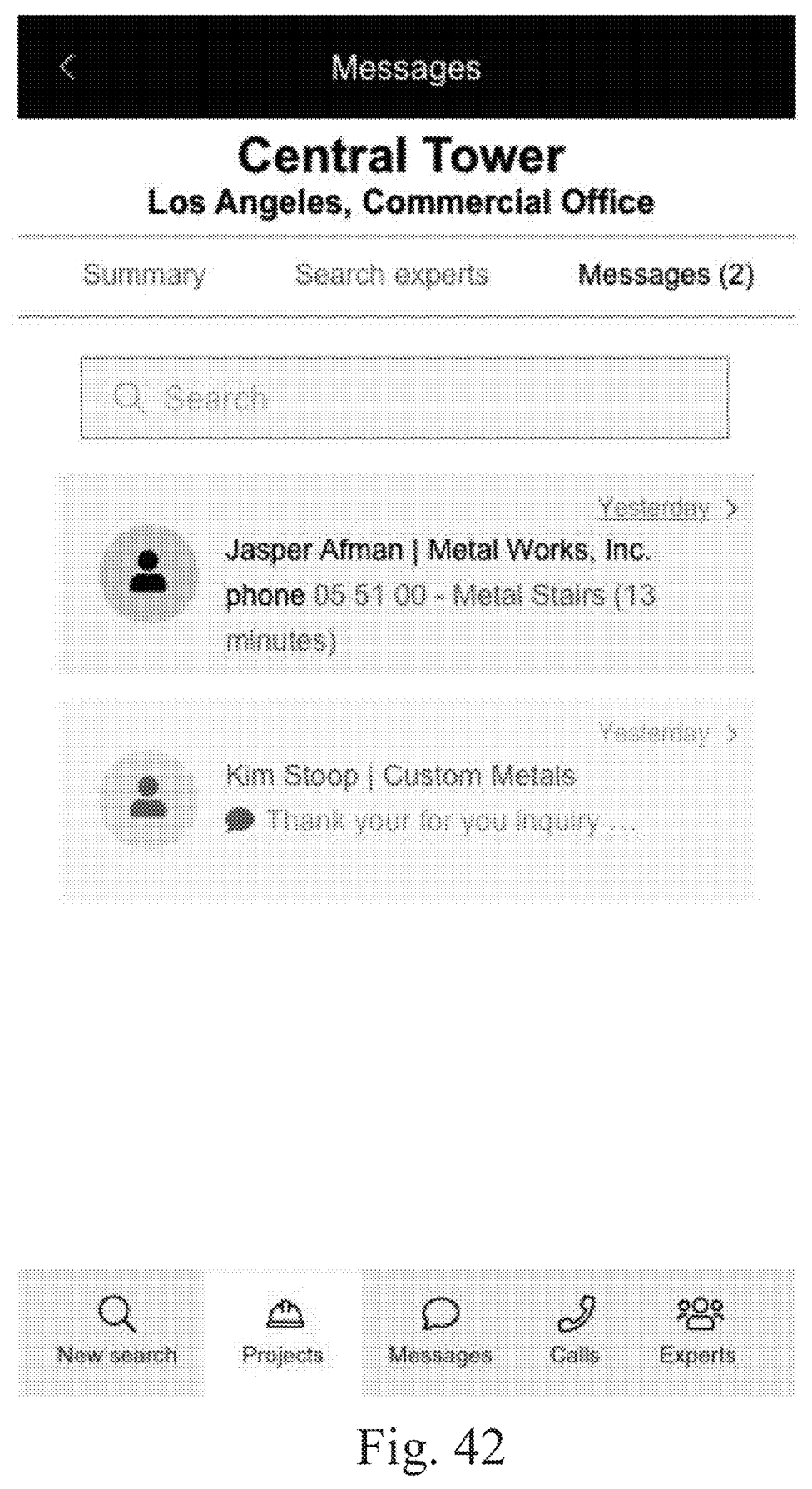
Figure 43:
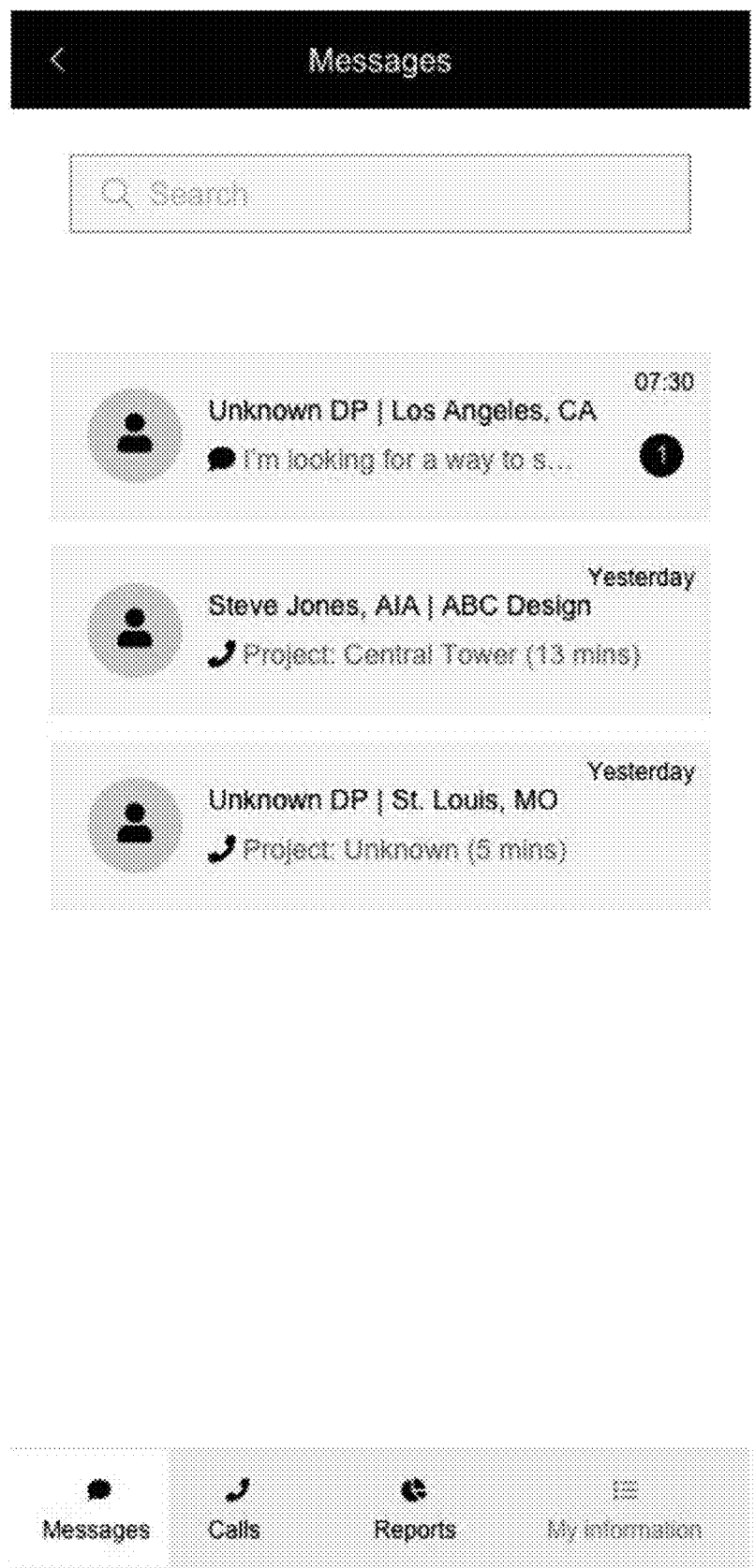

FIG. 42 illustrates the A/DP Project Messages screen, showing a summary of messages, whether chat or call, with the option to see the full message or call information, by clicking the ">" symbol located at the upper right hand corner of each message. FIG. 43 illustrates the BPE Messages screen. This is the BPE screen that allows the BPE to see their message history, shown as a searchable list.

Figure 44:

FIG. 44 illustrates the BPE Reports screen. This is the BPE screen that allows the BPE to view their entire activity on the supplier engagement system 200, with options to adjust the date range of the report, and options to see all activity using the ALL selection, or as messages and calls separately, using the MESSAGES and CALLS selections, respectively. The BPE Reports screen is a powerful reporting tool for BPEs, most of whom are required to provide daily, weekly or monthly activity reports to their managers. These reports can also be exported and sent to multiple managers, via email, allowing managers who are not users of the supplier engagement system 200 to be able to receive and review BPE activity reports.

Figure 45:
Figure 46:

FIG. 45 illustrates the Company Administrator (CA) BPE Overview screen. This screen allows the CA (and/or DA) to view their list of BPEs with the ability to view, edit, and delete BPE profiles. In an example embodiment, only the CA can delete BPE profiles from the supplier engagement system 200. The list of BPEs is searchable and sortable. Additionally, the status of each BPE is shown on their profile (e.g., Active, Inactive, or Needs Review). The BPE Detailed Profile page can be viewed for each BPE by clicking on the ">" symbol on the right side of each BPE summary. The CA (and/or DA) can also add new BPEs using the ADD BPE button at the top of the screen. FIG. 46 illustrates the Company Administrator (CA) Reports screen. This screen allows the CA (and/or DA) to see activity data for each and all BPEs under their management. The date range can also be modified by using the Select date range fields at the top of the reports screen.

Figure 47:
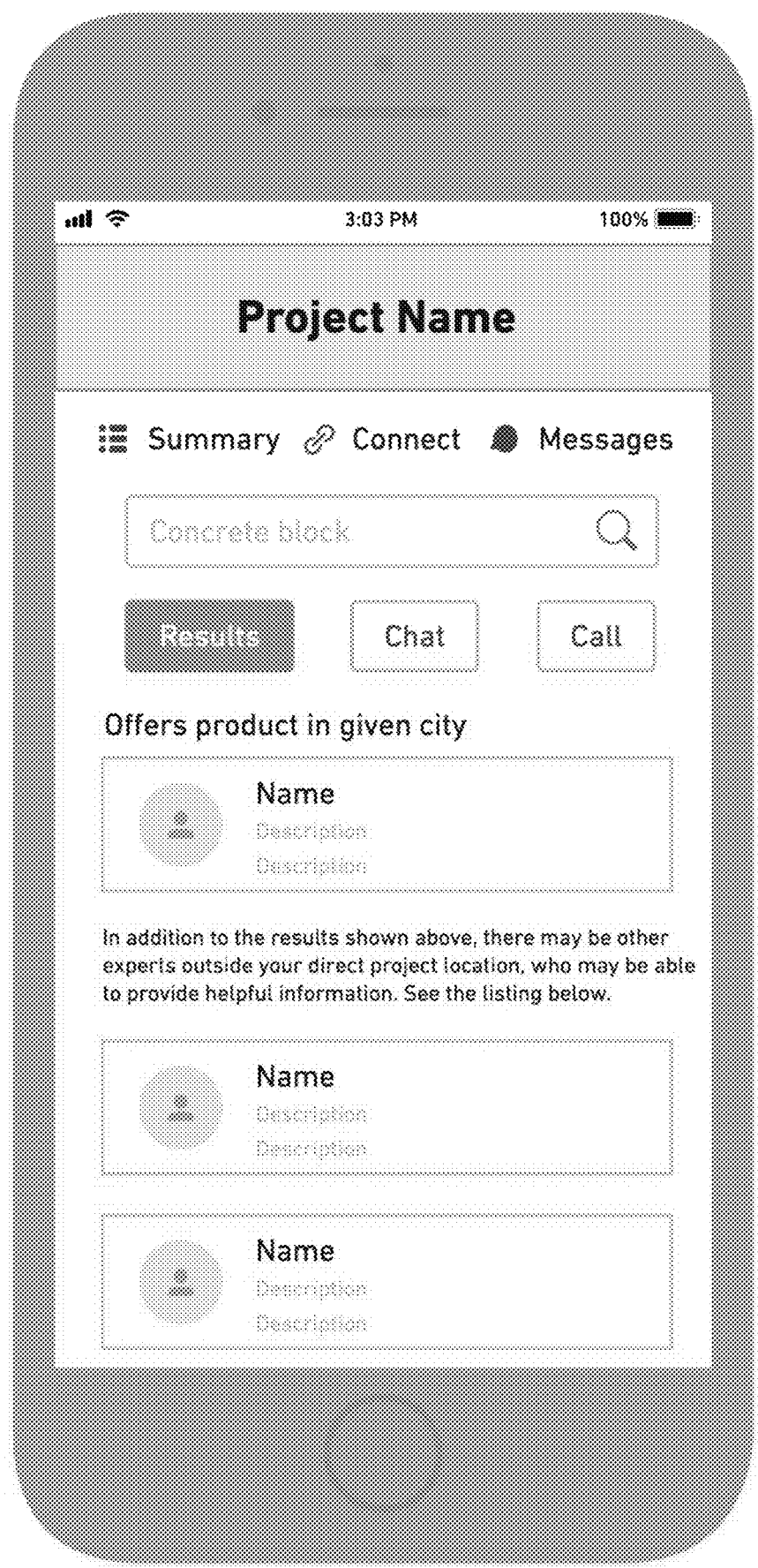

FIG. 47 illustrates an alternative implementation of the search results screen as shown in FIG. 27 and described above. In the alternative search results screen shown in FIG. 47, the search results presented in the search results screen can be expanded to include a set of BPEs who may be outside of the A/DPs direct project location, but who still may be able to provide useful information for the A/DP. The alternative search results screen can be used at the early stages of the development of the supplier engagement system 200 when the supplier engagement system database 112 has not been fully populated with BPEs. In this case, an A/DP may have few, if any, direct matches of relevant BPEs who can offer solutions in the exact market of a given project city of the A/DP. Thus, it may be beneficial to provide the A/DP with the option to access product experts (BPEs) in the genre of the products for which the A/DP is searching, but who may not be doing business in the exact project city. In these cases, a BPE located outside of the relevant territory could still be able to provide direction and expert advice to the A/DP, and/or be able to direct the A/DP to others for additional assistance.

Figure 48:

FIG. 48 illustrates a user interface screen used to allow A/DPs to suggest or refer manufacturers who are not yet on the supplier engagement system 200. In this manner, representatives of the supplier engagement system 200 can try to offer the service to the manufacturers being requested or referred by the A/DPs.

Figure 49:
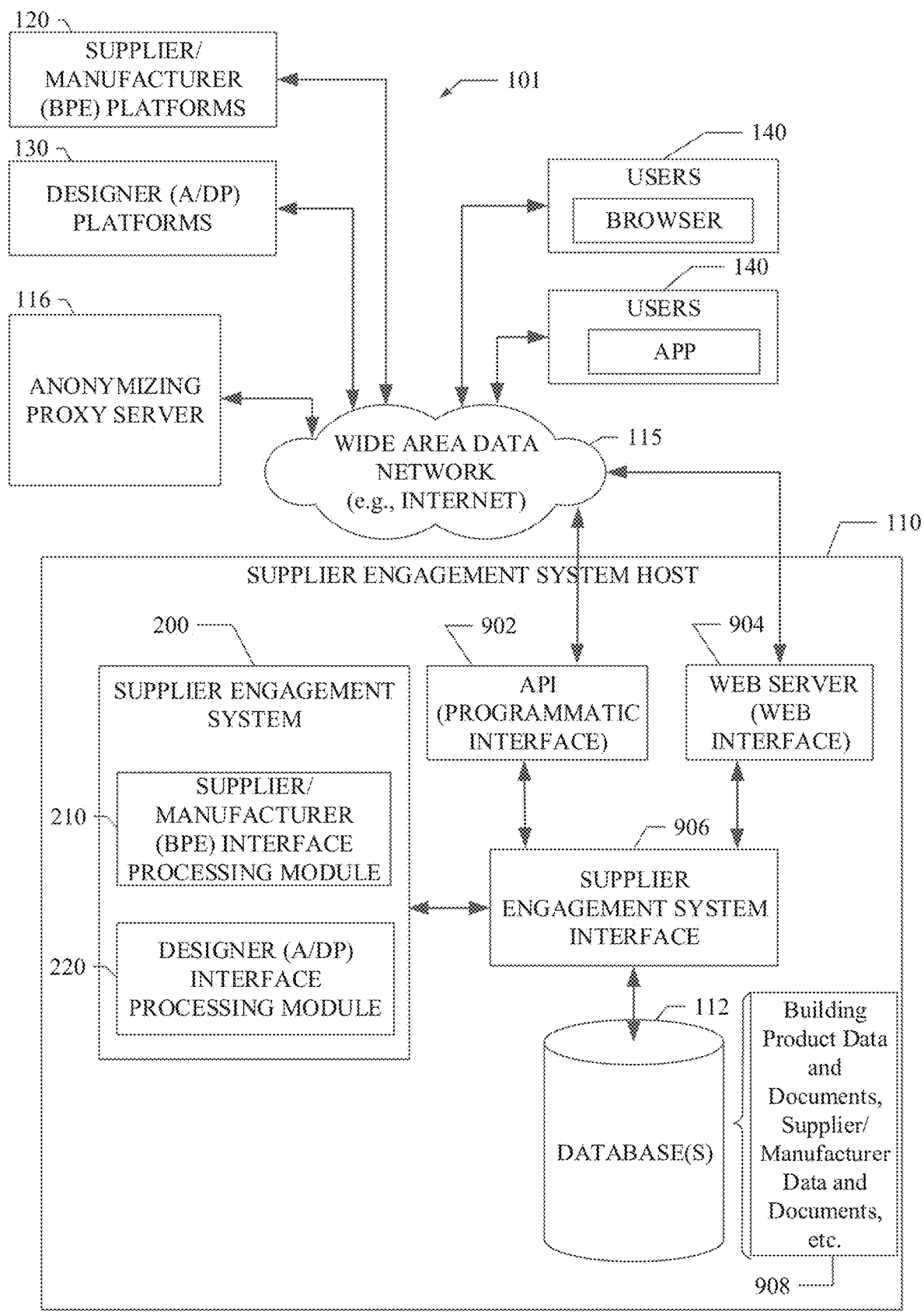
FIG. 49 illustrates another example embodiment of a networked system in which various embodiments may operate.

Referring now to FIG. 49, another example embodiment 101 of a networked system in which various embodiments may operate is illustrated. In the embodiment illustrated, the host site 110 is shown to include the supplier engagement system 200. The supplier engagement system 200 is shown to include the supplier/manufacturer (BPE) interface processing module 210 and the designer (A/DP) interface processing module 220, as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the supplier engagement system 200 either directly or via an interface 906. The supplier engagement system 200 may be configured to access a data storage device 112 either directly or via the interface 906.

Figure 50:
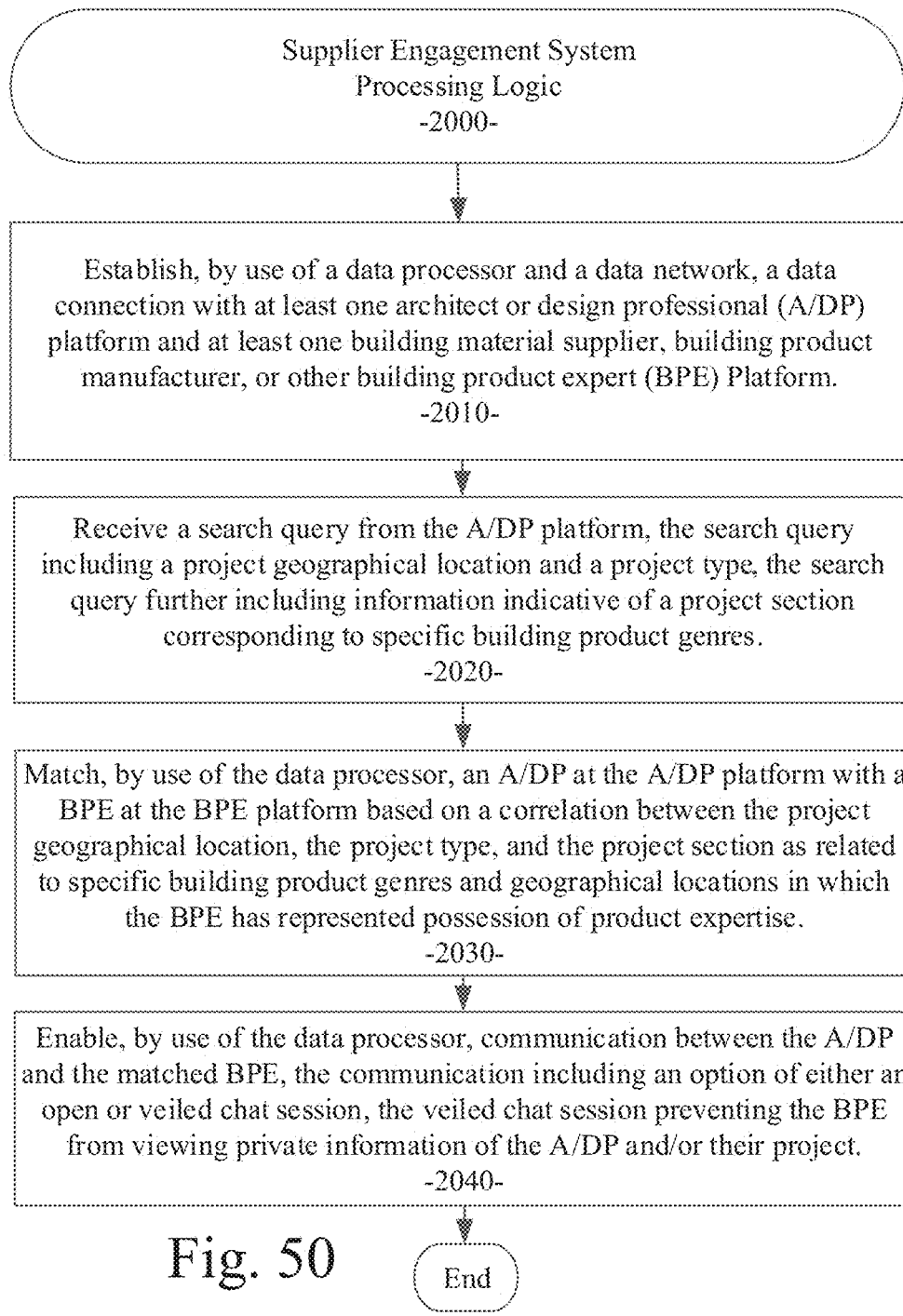
FIG. 50 illustrates a processing flow diagram that illustrates an example embodiment of a method as described herein.

Referring now to FIG. 50, a processing flow diagram illustrates an example embodiment of a method implemented by the supplier engagement system 200 as described herein. The method 2000 of an example embodiment includes: establishing, by use of a data processor and a data network, a data connection with at least one architect or design professional (A/DP) platform and at least one building material supplier, building product manufacturer, or other building product expert (BPE) platform (processing block 2010); receiving a search query from the A/DP platform, the search query including a project geographical location and a project type, the search query further including information indicative of a project section corresponding to specific building product genres (processing block 2020); matching, by use of the data processor, an A/DP at the A/DP platform with a BPE at the BPE platform based on a correlation between the project geographical location, the project type, and the project section as related to specific building product genres and geographical locations in which the BPE has represented possession of product expertise (processing block 2030); and enabling, by use of the data processor, communication between the A/DP and the matched BPE, the communication including an option of either an open or veiled chat session, the veiled chat session preventing the BPE from viewing private information of the A/DP and/or their project (processing block 2040).

Figure 51:
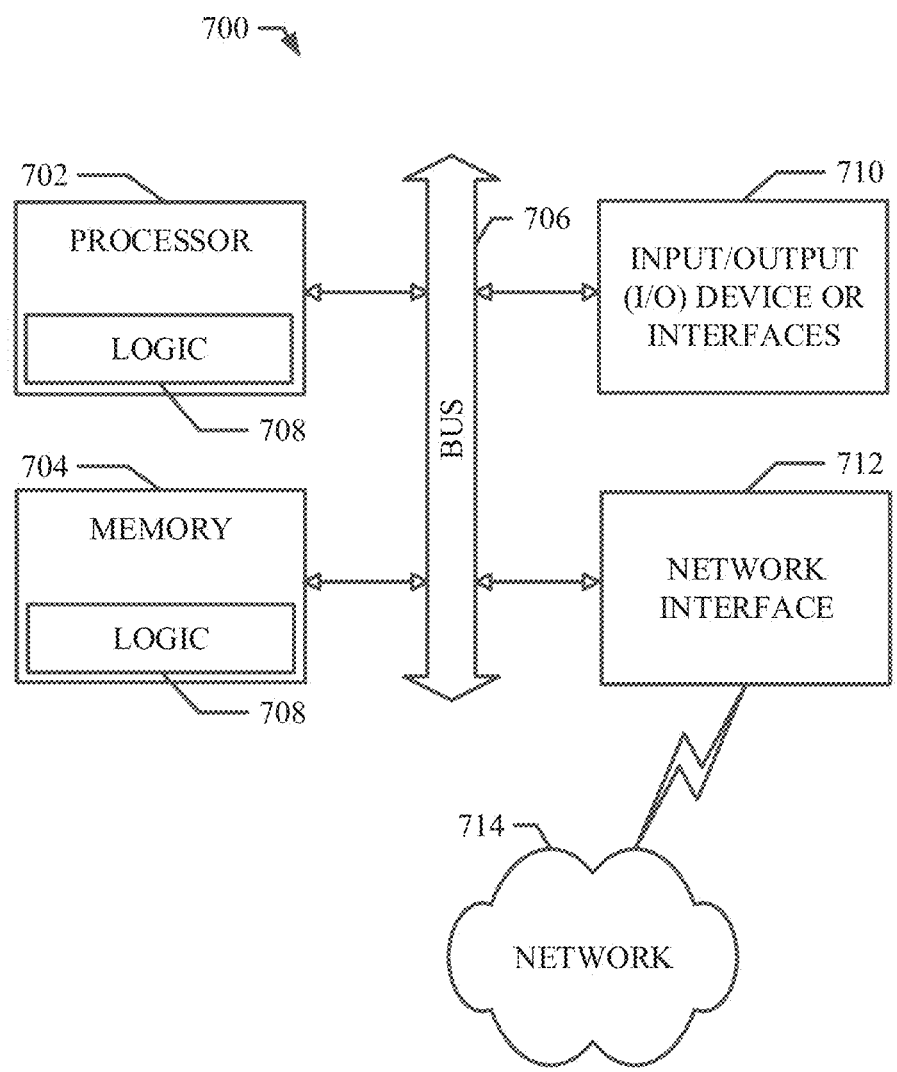
FIG. 51 shows a diagrammatic representation of a machine in the example form of a computer system within which a set of instructions when executed may cause the machine to perform any one or more of the methodologies discussed herein.

FIG. 51 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a mobile device, a web appliance, a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, 5th (5G) generation and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In various example embodiments described herein, a system and method for connecting designers with product suppliers or manufacturers in the construction industry are disclosed. In the various example embodiments described herein, a computer-implemented tool or software application (app) as part of a supplier engagement system is described to automate and improve the ability for architects and design professionals to efficiently connect and engage with building product suppliers for a building project. In various example embodiments described herein, the supplier engagement system provides a series of processes to facilitate an architect or design professional's ability to search for and connect with a building product supplier or manufacturer best suited to provide needed information for the designer. As a result, the described embodiments improve the fields of data communication, network connectivity, network-based searchability, and an improved ability for architects and design professionals to connect and communicate with building product suppliers or manufacturers in the construction industry.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
   establishing, by use of a data processor and a data network, a data connection with at least one architect or design professional (A/DP) platform and at least one building material supplier, building product manufacturer, or other building product expert (BPE) platform;
   receiving a search query from the A/DP platform, the search query including a project geographical location, a project type, and information indicative of a building product associated with a project;
   matching the building product with a database of specific building product genres;
   auto-populating a data field of a user interface with a matching specific building product genre corresponding to the building product;
   matching, by use of the data processor, an A/DP at the A/DP platform with a BPE at the BPE platform based on a correlation between the project type and the matching specific building product genre as related to project types and specific building product genres in which the BPE has represented possession of specific expertise;
   matching, by use of the data processor, an A/DP at the A/DP platform with a BPE at the BPE platform based on a correlation between the project geographical location and geographical locations in which the BPE has represented possession of specific expertise in the matching specific building product genre available at the project geographical location; and
   enabling, by use of the data processor, communication between the A/DP and the matched BPE, the communication being a veiled communication, the veiled communication preventing the BPE from viewing private information of the A/DP and the project of the A/DP.

2. The method of claim 1 further including enabling a Company Administrator (CA), a Division Administrator (DA), or the BPE to specify information about specific building product genres in which the BPE represents and possesses product expertise.

3. The method of claim 1 wherein the database of specific building product genres corresponds to Construction Specifications Institute (CSI), the MasterFormat®/CSI Divisions, Sections, Sub-Sections, and Sub-Sub-Sections.

4. The method of claim 1 further including enabling a Company Administrator (CA), Division Administrator (DA) or the BPE to specify geographical locations in which the BPE has represented possession of specific expertise in the matching specific building product genre available at the project geographical location, the specified geographical locations including primary and secondary product territories.

5. The method of claim 4 wherein a higher degree of relevance is placed on the primary product territory and a lesser degree of relevance is placed on the secondary product territory.

6. The method of claim 1 further including presenting a search results display showing real-time availability status for each matching BPE.

7. The method of claim 1 further including presenting a search results display showing a plurality of matching BPEs and enabling the A/DP to initiate a communication with multiple BPEs at once.

8. A system comprising:
   a data processor;
   a network interface, in data communication with the data processor, for communication on a data network; and
   a supplier engagement system, executable by the data processor, to:
      establish, by use of a data processor and a data network, a data connection with at least one architect or design professional (A/DP) platform and at least one building material supplier, building product manufacturer, or other building product expert (BPE) platform;
      receive a search query from the A/DP platform, the search query including a project geographical location, a project type, and information indicative of a building product associated with a project;
      match the building product with a database of specific building product genres;
      auto-populate a data field of a user interface with a matching specific building product genre corresponding to the building product;
      match, by use of the data processor, an A/DP at the A/DP platform with a BPE at the BPE platform based on a correlation between the project type and the matching specific building product genre as related to project types and specific building product genres in which the BPE has represented possession of specific expertise;

match, by use of the data processor, an A/DP at the A/DP platform with a BPE at the BPE platform based on a correlation between the project geographical location and geographical locations in which the BPE has represented possession of specific expertise in the matching specific building product genre available at the project geographical location; and enable, by use of the data processor, communication between the A/DP and the matched BPE, the communication being a veiled communication, the veiled communication preventing the BPE from viewing private information of the A/DP and the project of the A/DP.

9. The system of claim 8 being further configured to enable a Company Administrator (CA), a Division Administrator (DA), or the BPE to specify information about specific building product genres in which the BPE represents and possesses product expertise.

10. The system of claim 8 wherein the database of specific building product genres corresponds to Construction Specifications Institute (CSI), the MasterFormat®/CSI Divisions, Sections, Sub-Sections, and Sub-Sub-Sections.

11. The system of claim 8 being further configured to enable a Company Administrator (CA), Division Administrator (DA) or the BPE to specify geographical locations in which the BPE has represented possession of specific expertise in the matching specific building product genre available at the project geographical location, the specified geographical locations including primary and secondary product territories.

12. The system of claim 11 wherein a higher degree of relevance is placed on the primary product territory and a lesser degree of relevance is placed on the secondary product territory.

13. The system of claim 8 being further configured to present a search results display showing real-time availability status for each matching BPE.

14. The system of claim 8 being further configured to present a search results display showing a plurality of matching BPEs and enabling the A/DP to initiate a communication with multiple BPEs at once.

15. A non-transitory machine-useable storage medium embodying instructions which, when executed by a machine, cause the machine to:

establish, by use of a data processor and a data network, a data connection with at least one architect or design professional (A/DP) platform and at least one building material supplier, building product manufacturer, or other building product expert (BPE) platform;

receive a search query from the A/DP platform, the search query including a project geographical location, a project type, and information indicative of a building product associated with a project;

match the building product with a database of specific building product genres;

auto-populate a data field of a user interface with a matching specific building product genre corresponding to the building product;

match, by use of the data processor, an A/DP at the A/DP platform with a BPE at the BPE platform based on a correlation between the project type and the matching specific building product genre as related to project types and specific building product genres in which the BPE has represented possession of specific expertise;

match, by use of the data processor, an A/DP at the A/DP platform with a BPE at the BPE platform based on a correlation between the project geographical location and geographical locations in which the BPE has represented possession of specific expertise in the matching specific building product genre available at the project geographical location; and enable, by use of the data processor, communication between the A/DP and the matched BPE, the communication being a veiled communication, the veiled communication preventing the BPE from viewing private information of the A/DP and the project of the A/DP.

16. The non-transitory machine-useable storage medium of claim 15 being further configured to enable a Company Administrator (CA), a Division Administrator (DA), or the BPE to specify information about specific building product genres in which the BPE represents and possesses product expertise.

17. The non-transitory machine-useable storage medium of claim 15 wherein the database of specific building product genres corresponds to Construction Specifications Institute (CSI), the MasterFormat®/CSI Divisions, Sections, Sub-Sections, and Sub-Sub-Sections.

18. The non-transitory machine-useable storage medium of claim 15 being further configured to enable a Company Administrator (CA), Division Administrator (DA) or the BPE to specify geographical locations in which the BPE has represented possession of specific expertise in the matching specific building product genre available at the project geographical location, the specified geographical locations including primary and secondary product territories.

19. The non-transitory machine-useable storage medium of claim 18 wherein a higher degree of relevance is placed on the primary product territory and a lesser degree of relevance is placed on the secondary product territory.

20. The non-transitory machine-useable storage medium of claim 15 being further configured to present a search results display showing a plurality of matching BPEs and enabling the A/DP to initiate a communication with multiple BPEs at once.

* * * * *